(12) United States Patent
Gope et al.

(10) Patent No.: US 11,244,094 B2
(45) Date of Patent: Feb. 8, 2022

(54) EIGEN AUGMENTATION METHODS FOR ELECTROMAGNETIC MODELLING AND SIMULATION

(71) Applicants: INDIAN INSTITUTE OF SCIENCE, Karnataka (IN); ROBERT BOSCH ENGINEERING AND BUSINESS SOLUTIONS PRIVATE LIMITED, Karnataka (IN)

(72) Inventors: Dipanjan Gope, Bangalore (IN); Gourav Chatterjee, Bangalore (IN); Arkaprovo Das, Bangalore (IN); Sreenivasulu Reddy Vedicherla, Bangalore (IN)

(73) Assignees: INDIAN INSTITUTE OF SCIENCE, Bangalore (IN); ROBERT BOSCH ENGINEERING AND BUSINESS SOLUTIONS PRIVATE LIMITED, Bangalore (IN)

( * ) Notice: Subject to any disclaimer, the term of this patent is extended or adjusted under 35 U.S.C. 154(b) by 443 days.

(21) Appl. No.: 16/319,221

(22) PCT Filed: Jul. 18, 2017

(86) PCT No.: PCT/IN2017/050295
§ 371 (c)(1),
(2) Date: Jan. 18, 2019

(87) PCT Pub. No.: WO2018/015972
PCT Pub. Date: Jan. 25, 2018

(65) Prior Publication Data
US 2019/0236227 A1 Aug. 1, 2019

(30) Foreign Application Priority Data
Jul. 18, 2016 (IN) .............................. 201641024555

(51) Int. Cl.
*G06F 30/23* (2020.01)
*G06F 17/16* (2006.01)
(Continued)

(52) U.S. Cl.
CPC .............. *G06F 30/23* (2020.01); *G06F 17/16* (2013.01); *G06T 17/20* (2013.01); *G06F 2111/10* (2020.01)

(58) Field of Classification Search
CPC ...... G06F 30/23; G06F 17/16; G06F 2111/10; G06T 17/20
See application file for complete search history.

(56) References Cited

U.S. PATENT DOCUMENTS 7,853,910 B1 * 12/2010 Zhu ....................... G06F 30/398
716/107
8,510,091 B1 8/2013 Zhao et al.
2009/0248373 A1 10/2009 Druskin et al.

OTHER PUBLICATIONS

Morgan, Ronald B. "Restarted GMRES Method Augmented With Eigenvectors" in SIAM J. Matrix Anal. Appl. (Society for Industrial and Applied Mathematics, 1995) vol. 16, No. 4, pp. 1154-1171 (Year: 1995).*

(Continued)

*Primary Examiner* — Rehana Perveen
*Assistant Examiner* — Daniel E Miller
(74) *Attorney, Agent, or Firm* — Cozen O'Connor

(57) ABSTRACT

Techniques for electromagnetic modelling of EM structures are described. Krylov subspace of a second EM structure is augmented with Eigen vectors of a first EM structure to form an augmented space. The second EM structure is a design variant of the first EM structure and the first EM structure is already EM modelled and simulated. Thereafter, Maxwell's equations for the second EM structure are solved using the augmented space.

14 Claims, 25 Drawing Sheets

(51) Int. Cl.
    *G06T 17/20*     (2006.01)
    *G06F 111/10*     (2020.01)

(56) References Cited

OTHER PUBLICATIONS

Ye, Zuochang, Zhenhai Zhu, and Joel R. Phillips. "Generalized Krylov recycling methods for solution of multiple related linear equation systems in electromagnetic analysis." (DAC, 2008) In Proceedings of the 45th annual Design Automation Conference, pp. 682-687. (Year: 2008).*
Das, Arkaprovo, and Dipanjan Gope. "Adaptive mesh refinement for fast convergence of EFIE-Based 3-D extraction." (IEEE, Mar. 2015) IEEE Transactions on Components, Packaging and Manufacturing Technology 5, No. 3: 404-414. (Year: 2015).*
Chatterjee, Gourav, Arkaprovo Das, and Dipanjan Gope. "Fast incremental 3D full-wave analysis for package-board design iterations via Eigen-GCR." (IEEE, 2014) In 2014 IEEE Electrical Design of Advanced Packaging & Systems Symposium (EDAPS), pp. 25-28. (Year: 2014).*
Chatterjee, Gourav, Arkaprovo Das, and Dipanjan Gope. "Fast convergence of MoM-based package-board extraction via incremental eigen-AGMRES method." (IEEE, 2014) In 2014 IEEE 23rd Conference on Electrical Performance of Electronic Packaging and Systems, pp. 151-154. (Year: 2014).*
PCT/IN2017/050295 Written Opinion of the International Search Authority, dated Nov. 9, 2017, 3 pages.

* cited by examiner

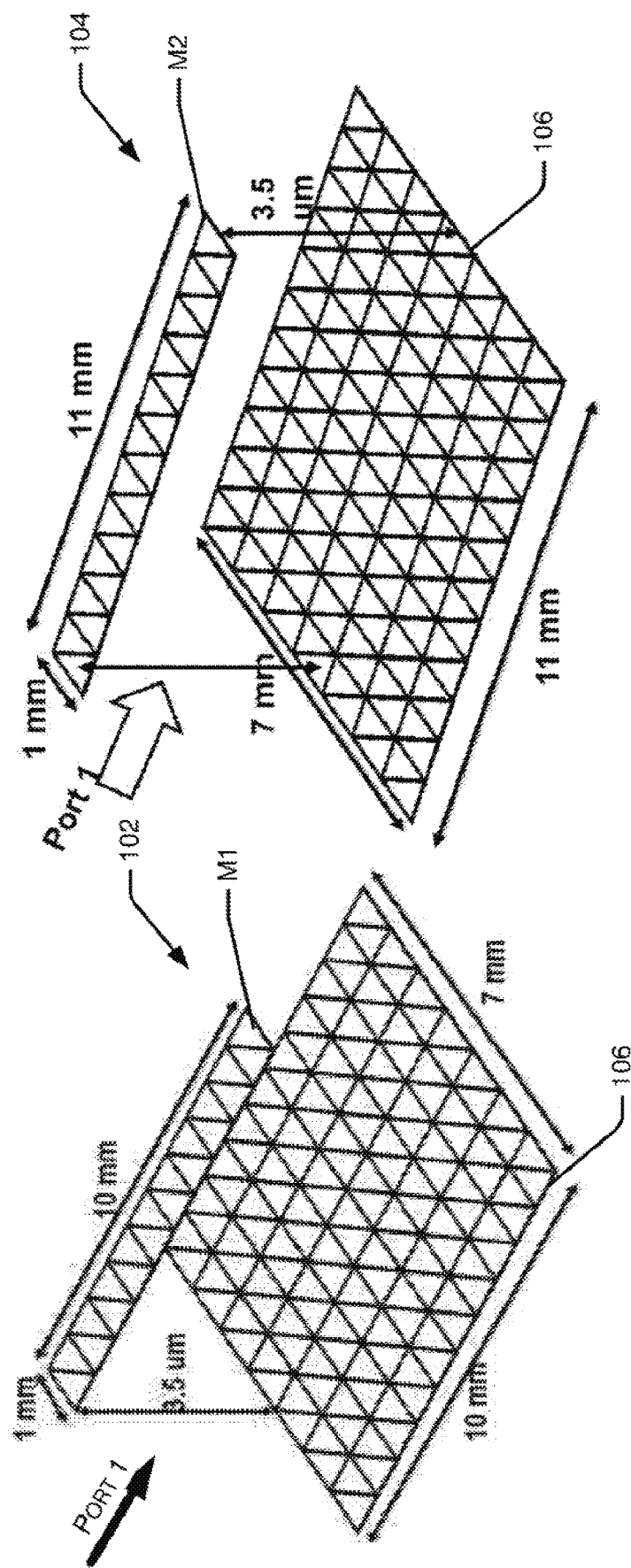

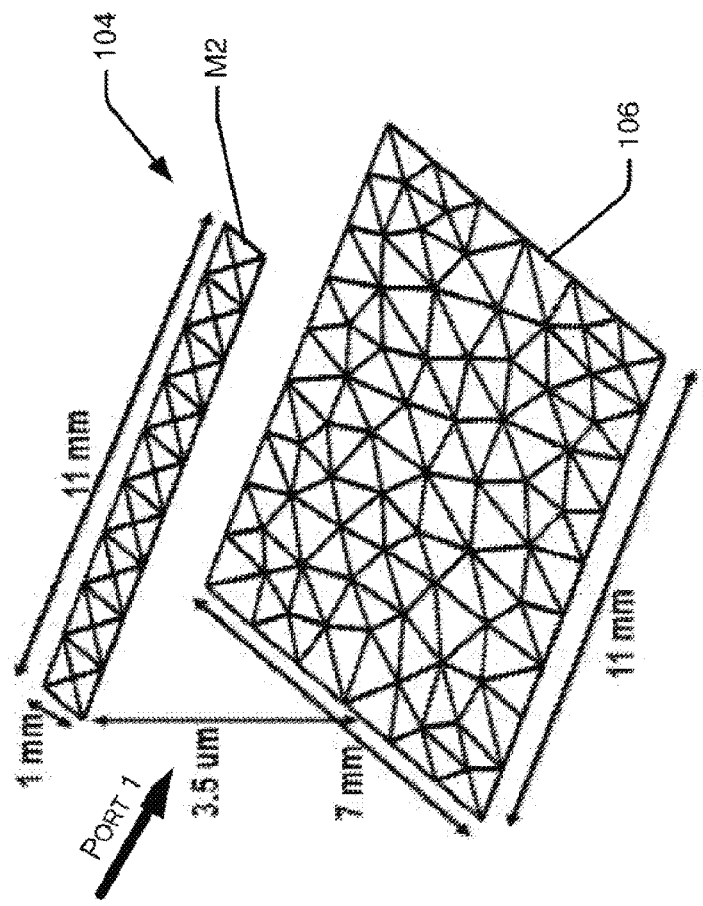
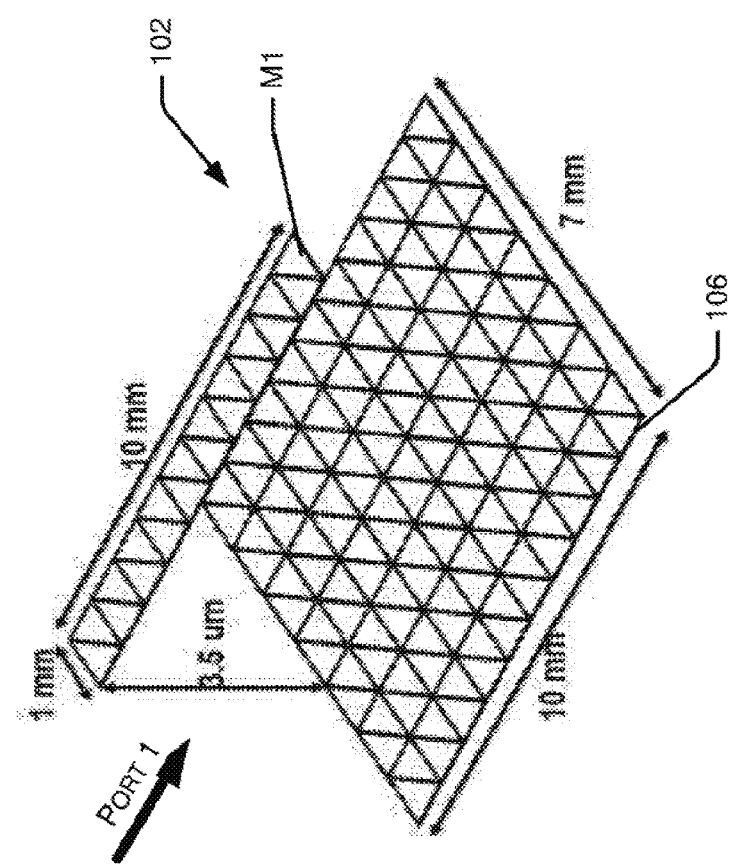
Fig. 4(a)
Fig. 4(b)

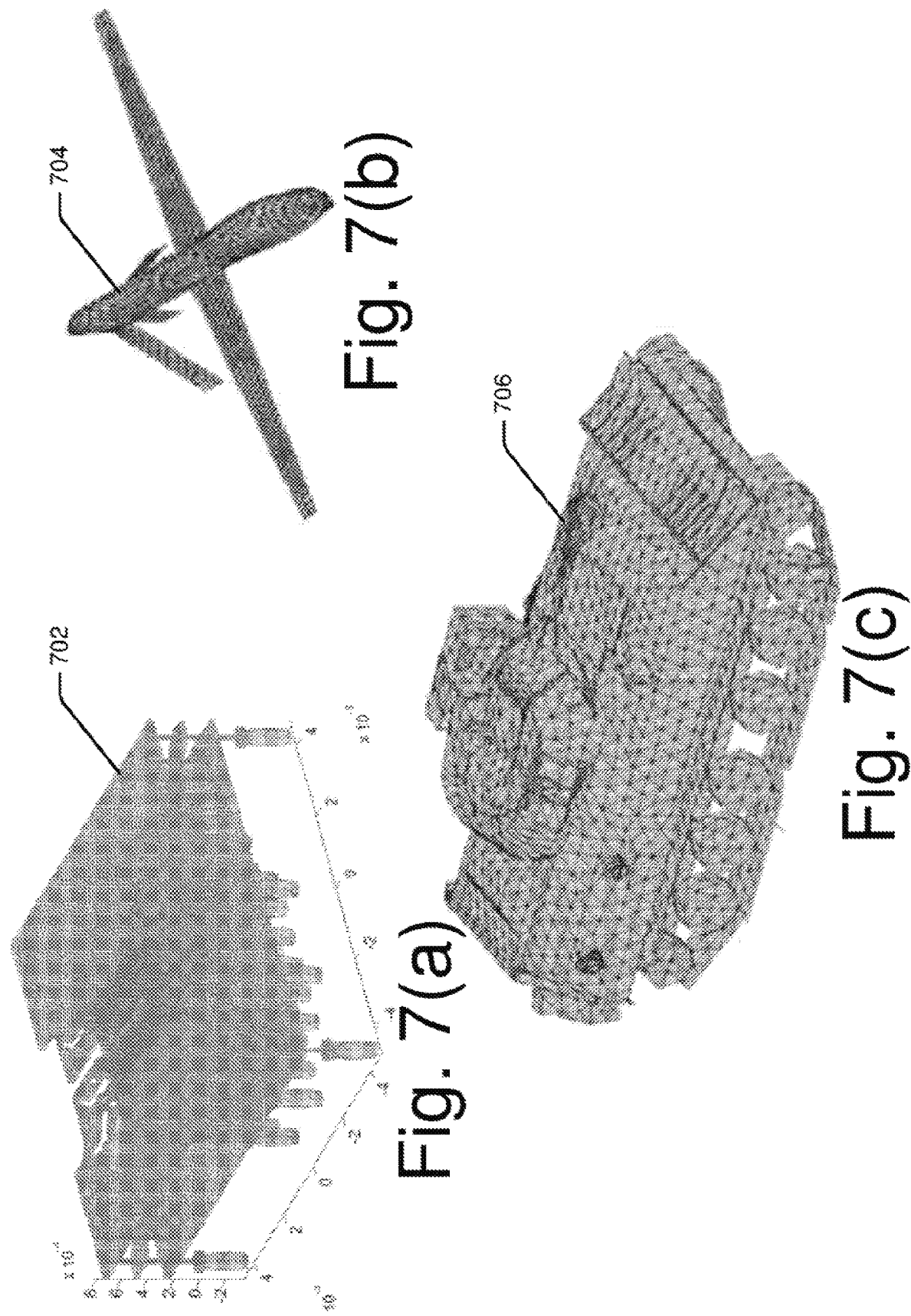

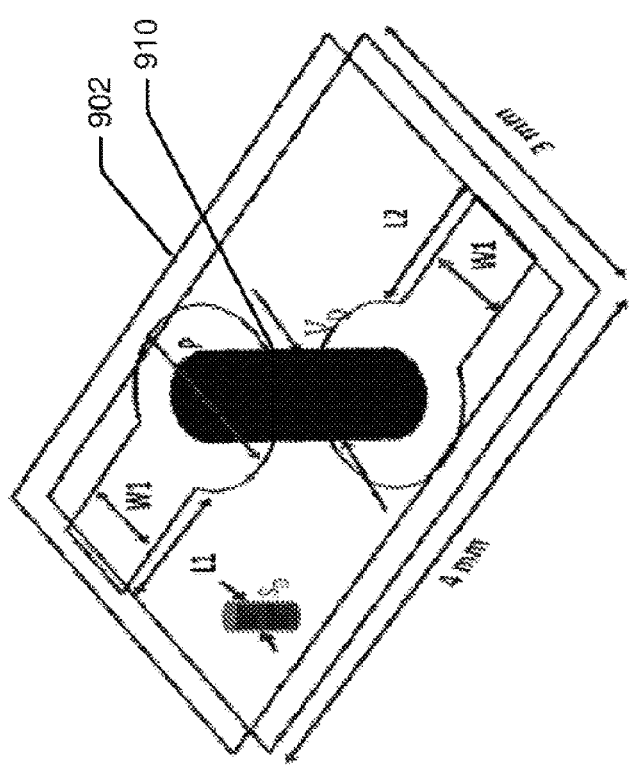
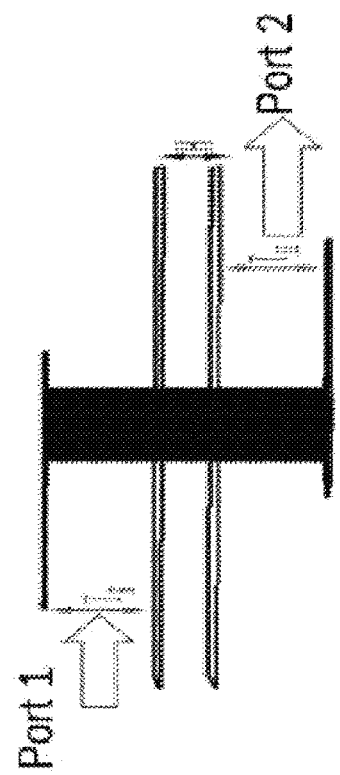
Fig. 9(a)
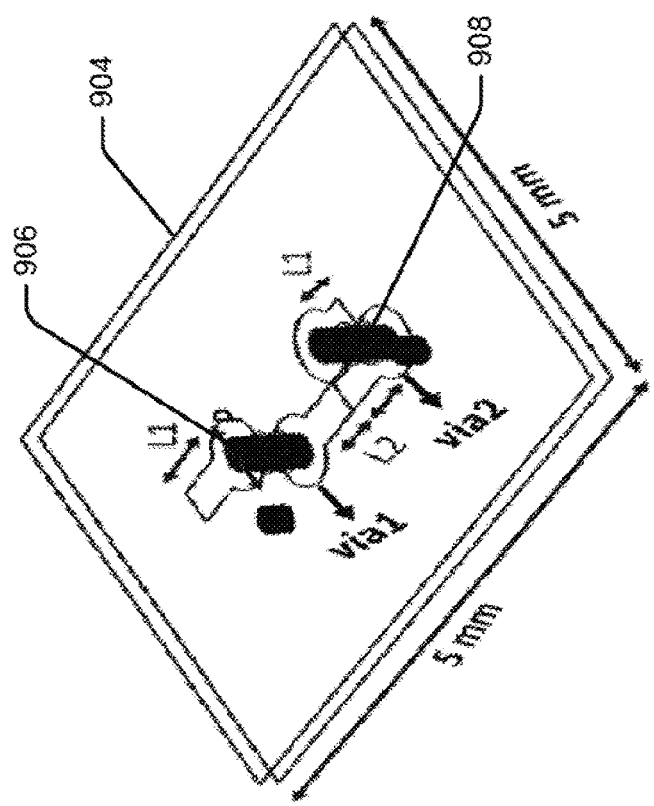
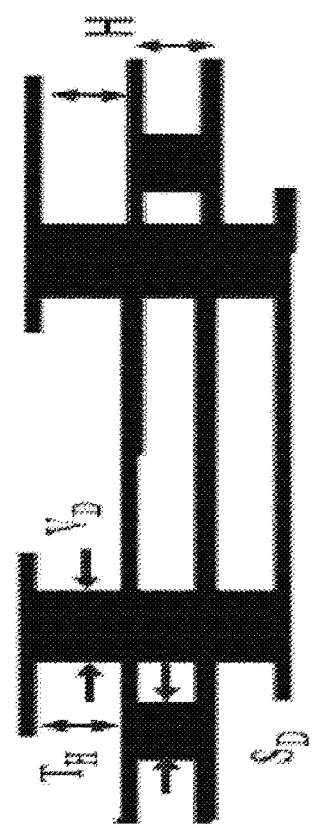
Fig. 9(b)

EIGEN AUGMENTATION METHODS FOR ELECTROMAGNETIC MODELLING AND SIMULATION

TECHNICAL FIELD

The present subject matter relates, in general, to electromagnetic modelling and in particular, to simulators connected with electromagnetic models.

BACKGROUND OF THE INVENTION

Electromagnetic (EM) modelling is a process of modelling interaction of EM fields with physical objects and environment. An example of EM modelling is the modelling of performance of a physical object in response to an EM field, for example, from an antenna. Another example of EM modelling is the modelling of EM radiation from an object, such as an electronic circuit, having several components working at multiple high frequencies and switching currents. EM modelling involves providing a mathematical framework for modelling interaction of EM fields from/on an object, and includes breaking the design of the object into finite number of mesh elements.

EM simulation refers to the solving of the EM model, and involves solving Maxwell's equations for each of the mesh elements. For example, in the case of the object whose performance in response to the EM field is modelled, the simulation involves predicting the electrical field (E) and magnetic field (H) response in each of the mesh elements and extrapolating it to the behaviour the object. In the case of the object radiating EM fields, EM simulation involves computing the radiation of the electric and magnetic fields from each of the mesh elements during operation of the object.

An object that is to be EM modelled and simulated may be referred to as an EM structure. The EM structures may be three-dimensional (3D) EM structures. The modelling and simulation of an EM structure may be collectively referred to as solving of an EM structure.

EM modelling and simulation is widely used in radar cross section computation, design of aircraft, terrestrial vehicle, and antenna, biomedical non-invasive detection and therapeutics, analysis of high frequency chip-package-system including high frequency printed circuit boards (PCBs) and energy harvesting.

EM modelling and simulation is complex and consumes substantial computing power and resources and takes a lot of time for each new EM structure to be modelled, even when the new EM structure is a design variation of a previously modelled structure.

BRIEF DESCRIPTION OF DRAWINGS

The features, aspects, and advantages of the subject matter will be better understood with regard to the following description, and accompanying figures. The use of the same reference number in different figures indicates similar or identical features and components.

FIG. 1(a) illustrates a first EM structure, in accordance with an implementation of the present subject matter.

FIG. 1(b) illustrates a second EM structure that is a design variant of the first EM structure, in accordance with an implementation of the present subject matter.

FIGS. 4(a) and 4(b) illustrate a case in which, while the geometrical properties of the first and second EM structures are similar, the mesh structure of the first EM structure is significantly different from the mesh structure of the second EM structure.

FIG. 7(a) illustrates triangular meshing on the surface of a complex 3D electronic structure that is to be EM modelled, in accordance with an implementation of the present subject matter.

FIG. 7(b) illustrates triangular meshing on the surface of an aerial vehicle that is to be EM modelled, in accordance with an implementation of the present subject matter.

FIG. 7(c) illustrates triangular meshing on the surface of a terrestrial vehicle that is to be EM modelled, in accordance with an implementation of the present subject matter.

FIGS. 9(a), 9(b), and 9(c) illustrate faster convergence in the solving of an extended EM structure due to the MIKR method, in accordance with an implementation of the present subject matter.

DETAILED DESCRIPTION

Figure 2A:
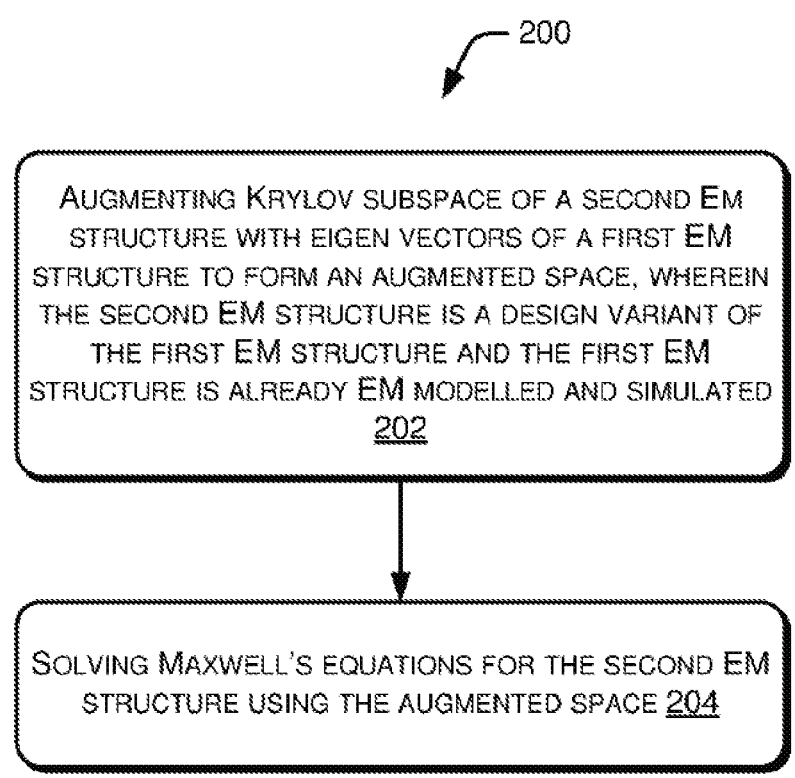
FIG. 2(a) illustrates a method for utilizing Eigen vectors from the solution of a first EM structure in the solution of a second EM structure in accordance with an implementation of the present subject matter.

Computational Electromagnetics involves determining solutions to electromagnetic scattering/radiation problems involving arbitrary shapes and material composition. Since electromagnetics in the real world involve EM fields and these EM fields can be represented in terms of Maxwell equations, the effects of these fields in the real world are indeed solutions of the Maxwell equations representing these fields. This generation of the solution set in a computational system is termed EM simulation. Solutions to these problems are iterative in nature and uses the method of moments (MoM) applied in general to a large number of triangular patches called mesh on the surface enclosing the EM structure and utilizing Rao-Wilton-Glisson (RWG) basis functions to define the electric and magnetic surface currents in the individual mesh elements modelled on the surface mesh elements.

The present subject matter relates to systems and methods for iteratively finding solutions to the EM current density through simulation. This subject matter discloses a newer approach to simulation of an EM structure when the EM structure is a design variant of an already solved EM structure. Carefully chosen information can be harnessed from the solution of the known structure and made available for use during the solution of the design variant structure.

The present subject matter relates to systems and methods for such electromagnetic (EM) modelling and simulation. EM modelling and simulation includes determining the response that an EM structure has to excitation(s), such as incident waves or currents that excite these elements, and determining the EM radiation from an EM structure.

Typical EM simulation involves simulating a system of Maxwell's equations representing an EM structure and the simulator moves iteratively towards solving for the vector solution that is the solution to the equation set. The core of a EM simulator is an iterative method supported with computational hardware and memory to hold the entire set of the solution space which is traversed iteratively from a possible starting point initial solution vector that is estimated or chosen. The simulator's core method then performs a set of iterative steps wherein each step generates a next vector that is nearer to the possible solution and this iterative procedure converges to a solution vector. This process is computationally intensive since the application of Maxwell's equation set representing on to the EM structure results in a large square matrix of N×N and N is a large number since the EM structure is divided into small mesh structures containing N mesh elements of the EM structure surface/volume. The computational problem of the EM structure reduces to a matrix form of equation set with the application of Maxwell's equations. The equation is the general form (1) represented below:

$$A*X=b \tag{1}$$

where A represents an N×N square matrix having real and/or complex numbers as elements, X is an N column vector to be the solution vector and b is a column vector of scalars. Thus, the matrix vector product A*X (Matrix vector product) forms the structure of a non-symmetric set of linear equations. The solution for the vector X is, in general, solvable by the matrix computation equation (2)

$$X=A^{-1}*b \tag{2}$$

where $A^{-1}$ represents the inverse of the matrix A.

Typically, when EM structure is subjected to EM modelling, the size of the N×N matrix would be very large, as the EM structure is divided into a large number of mesh elements and containing N points of the EM structure surface/volume. Therefore, the computation of $A^{-1}$ can consume a large amount of computing resources, and therefore, typically not attempted.

Conventional methods for EM modelling, such as Generalized Minimal Residual (GMRES) and Method of Moments (MoM), involve iterative procedures that take guessed vectors as possible starting solution vectors and compute a residual term as represented by equation (3). The methods proceed iteratively to move through a set of decreasing residuals with each iterative vector $X_i$ arrived at in each iteration. The procedure converges to a scalar less than an arbitrarily small number, signifying a solution vector X being attained.

$$(b-A*X_i)=r_i \tag{3}$$

Conventional simulation procedures use a set of techniques to iteratively move towards lowering the residual $r_i$ in each iterative step starting with a seed vector and converge to the solution considering a very low residual as the iterative end point. In general, the number of iterations needed to converge cannot exceed N (the size of the matrix A).

The description below shows the GMRES method for the numerical solution of a non-symmetric system of linear equations of the structure of the equation (1). The method approximates the solution by the vector in a Krylov subspace with minimal residual. Arnoldi iteration may be used to iterate to the solution vector.

GMRES sets up an iterative vector space starting with b itself taken as the seed vector and enumerated as below in (4) as the Krylov subspace.

$$K_n=K_n(A,b)=\text{span}\{b,Ab,A^2b,\ldots,A^{n-1}b\} \tag{4}$$

In this Krylov subspace, each iteration adds one vector to the subspace dependent on the matrix A and the column vector b. In this procedure, at each iterative step, Arnoldi iteration is used to ortho-normalize (the vectors are made orthogonal to each other and the magnitude is normalized to 1) the vectors that are populating the Krylov subspace. Note here that the vector, for example, $A^2b$ is denoting the product A*Ab where Ab was reached in the previous iteration. The total vector space (Krylov space) contains n−1 vectors so arrived at.

As known in art, when GMRES is applied to solve an EM structure, the Matrix A corresponding to the EM structure, to be solved using Maxwell's equations set, is derived from a mesh structure associated with the EM structure. The surface of the mesh structure represents a mesh of surface currents due to EM fields tangential and normal to the structure. The mesh divides the surface into several surface elements and the current in the mesh is the current density perpendicular to each edge of each of the surface element. Maxwell's equations are used to set up the set of equations represented by A*X. The size of the matrix A, N×N, is dependent of the number of mesh edges in the mesh structure. The EM structure is therefore unique to a given mesh structure and the solution iteratively moves through the Krylov subspace and the iterative end is the solution vector as previously described where the residual n is close to zero or lower than arbitrarily set low threshold. This is called iterative simulation of the EM structure.

An EM model, having an associated mesh structure, is characterized by the iterative solution procedure with a Krylov subspace as described in equation (4) and the procedure to compose the Krylov subspace was also briefly described. As will be understood, the time taken for the EM modelling to complete depends on the number of steps taken in the iterative procedure. As the size of the matrix A increases, the number of steps for convergence to a solution, and therefore, the time taken to complete the EM modelling and simulation, could be very large.

EM modelling and simulation is typically used in the design of various structures for analysing the behaviour of the structures in response to EM fields or for analysing the EM radiations from the structures. For example, an electronic packaging structure having several electronic components working at multiple high frequencies and switching currents may be EM modelled and simulated to ensure electromagnetic compatibility (EMC) and reduce electromagnetic interference (EMI). In other words, predicting the EM radiation for such EM structures is of critical importance apriori in design so that the designer can predict with reasonable accuracy the circuit performance and ensure that the designed structure of the device/system is compliant with its design specifications and may be ready for manufacturing/commercialization (in this case EM radiation is within limits). Further, EM modelling and simulation can also be used to ensure detectability of vehicles by radar.

Typically, the design of the EM structures may be modified, for example, due to inputs from signal integrity analysis team, power integrity analysis team, and package layout design team. For example, the EM structure may get geometrically larger, and may be an extension of an earlier existing EM structure. Such a modified EM structure may be referred to as a design variant of the earlier EM structure. Conventional solution methods treat each EM structure to be EM modelled and simulated independently, and solve Maxwell's equations for each EM structure separately even if the design variant EM structure has significant similarities with the earlier EM structure for which Maxwell's equations were already solved. Therefore, significant wastage of computational effort and time occurs for the simulation of the design variant EM modelling.

Thus, at the design stage these structures might go through innumerable simulation before the design represented by the EM structure is estimated as compliant to the design objective. A significant time is spent in these simulations and so simulation speed is directly related to the time consumed for the EM modelling and hence the time to bring a product to market and the design costs for a product. For example, in the above example of the electronic packaging structure, significant amount of time and computational resources may have to be expended to come up with a design ensuring EMC.

The present subject matter describes systems and methods for EM modelling and simulation. With the systems and methods of the present subject matter, EM modelling of design variants of earlier modelled EM structures can be performed in an efficient manner with less time and computational resources.

In an implementation of the present subject matter, Krylov subspace of a second EM structure is augmented with Eigen vectors of a first EM structure to form an augmented space. The second EM structure is a design variant of the first EM structure and the first EM structure is already EM modelled and simulated. Then, Maxwell's equations for the second EM structure are solved using the augmented space.

In another implementation of the present subject matter, Krylov vectors of a first EM structure are interpolated to a second EM structure, where the second EM structure is a design variant of the first EM structure, the first EM structure is already EM modelled and simulated, and a mesh structure of the first EM structure is different from that of the second EM structure. A Krylov subspace of the second EM structure is augmented with the interpolated Krylov vectors to form an augmented Krylov subspace. The augmented Krylov subspace of the second EM structure is augmented with interpolated Eigen vectors of the first EM structure to form an augmented space. Thereafter, Maxwell's equations for the second EM structure are solved using the augmented space.

The present subject matter performs EM modelling of a newer EM structure using the Krylov vectors and Eigen vectors of a previous EM structure. This speeds-up the EM modelling process by about 30 times and enables a simulation system to rapidly converge to a solution of the newer structure. Since the Eigen vectors and Krylov vectors from a similar EM structure are used for solving Maxwell's equations of a given EM structure, the time that will be consumed for solving Maxwell's equations of the given newer EM structure is significantly reduced. Therefore, accurate EM modelling can be performed with less consumption of time. Further, the interpolation of the Krylov vectors and the Eigen vectors ensures that Krylov vectors and Eigen vectors from the previous EM structure can be used even if it has different mesh structure from the current EM structure.

The above and other features, aspects, and advantages of the subject matter will be better explained with regard to the following description, appended claims, and accompanying figures. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present disclosure. Moreover, all statements herein reciting principles, aspects, and examples thereof, are intended to encompass equivalents thereof. Further, for the sake of simplicity, and without limitation, the same numbers are used throughout the drawings to reference like features and components.

FIG. 1(a) illustrates a first EM structure 102, in accordance with an implementation of the present subject matter.

The first EM structure 102 is used for a signal transmission with a port (a point where a signal is input), port 1. The first EM structure 102 has an associated mesh structure M1, represented by a plurality of triangles oriented in a particular fashion in FIG. 1(a), used for applying the Maxwell's equations on the surfaces of the first EM structure 102. The procedures known in art can be used for the solving of equation (1) that has been formed using RWG Basis functions for the first EM structure 102.

FIG. 1(b) illustrates a second EM structure 104 that is a design variant of the first EM structure 102, in accordance with an implementation of the present subject matter. As will be understood, a design variant of an EM structure may have some variations in the design aspects, such as dimensions. In an implementation, the second EM structure 104 may have a larger dimension, such as length, than the first EM structure 102. The first EM structure 102 and the second EM structure 104 may be three-dimensional (3D) EM structures.

In an implementation, the first EM mesh structure 102 and the second EM mesh structure 104 are micro-strip lines over a ground plane 106, both being part of a multilayer printed circuit board (PCB). As illustrated, the separation between the first EM structure 102 and the ground plane 106 and the separation between the second EM mesh structure 104 and the ground plane 106 are same (3.5 μm). Further, as illustrated, the second EM mesh structure 104 (11 mm long) is longer than, i.e., an extended version of, the first EM mesh structure 102 (10 mm long). The second structure is shown with a set of mesh elements different from the mesh elements of the earlier structure 102 in FIG. 1(a).

While, as known in art, the GMRES procedure using the Krylov subspace vectors-based iterations can be used to find the solution for the first EM structure 102, the iterative procedure to simulate for the extended EM structure (second EM structure 104) would have taken a new set of iterative steps starting from a seed vector. Such an iterative procedure will have more number of steps, as the matrix size of second EM structure 104 will be larger than the first EM structure 102 (due to the larger size of the second EM structure 104).

The present subject matter selectively reuses the Eigen vectors from the solution of first EM structure 102 in the solution subspace of the second EM structure 104.

The present subject matter augments the Eigen vectors in the Krylov subspace of second EM structure 104. As a result, the EM simulation for the second EM structure 104 is rapidly speeded up, and converges to a solution in significantly less number of iterations.

The present subject matter enables speeding up the solution of a subsequent EM structure (D2), such as the second EM structure 104, that is a design variant of an of an earlier solved EM structure (D1), such as the first EM structure 102, using the Eigen vectors of D1. The terms D1 and first EM structure will be interchangeably used in the description to denote EM structures that are already EM modelled and simulated, while the terms D2 and second EM structure will be interchangeably used in the description to denote EM structures that are design variants of D1 and are yet to be EM modelled and simulated.

FIG. 2(a) illustrates a method 200 for utilizing Eigen vectors from the solution of a first EM structure, such as the first EM structure 102, in the solution of the second EM structure, such as the second EM structure 104, in accordance with an implementation of the present subject matter.

The order in which the method 200 is described is not intended to be construed as a limitation, and any number of the described method blocks may be combined in any order to implement the method 200, or an alternative method. Furthermore, the method 200 may be implemented by processor(s) or computing device(s) through any suitable hardware, non-transitory machine readable instructions, or a combination thereof.

It may be understood that steps of the method 200 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media.

At block 202, Krylov subspace of the second EM structure is augmented with Eigen vectors of the first EM structure to form an augmented space. The second EM structure is a design variant of the first EM structure and the first EM structure is already EM modelled and simulated.

At block 204, the Maxwell's equations for the second EM structure is solved using the augmented space. The Maxwell's equations may be solved using the GMRES method. The various steps of the method 200 are explained with reference to FIG. 2(b).

Figure 2B:
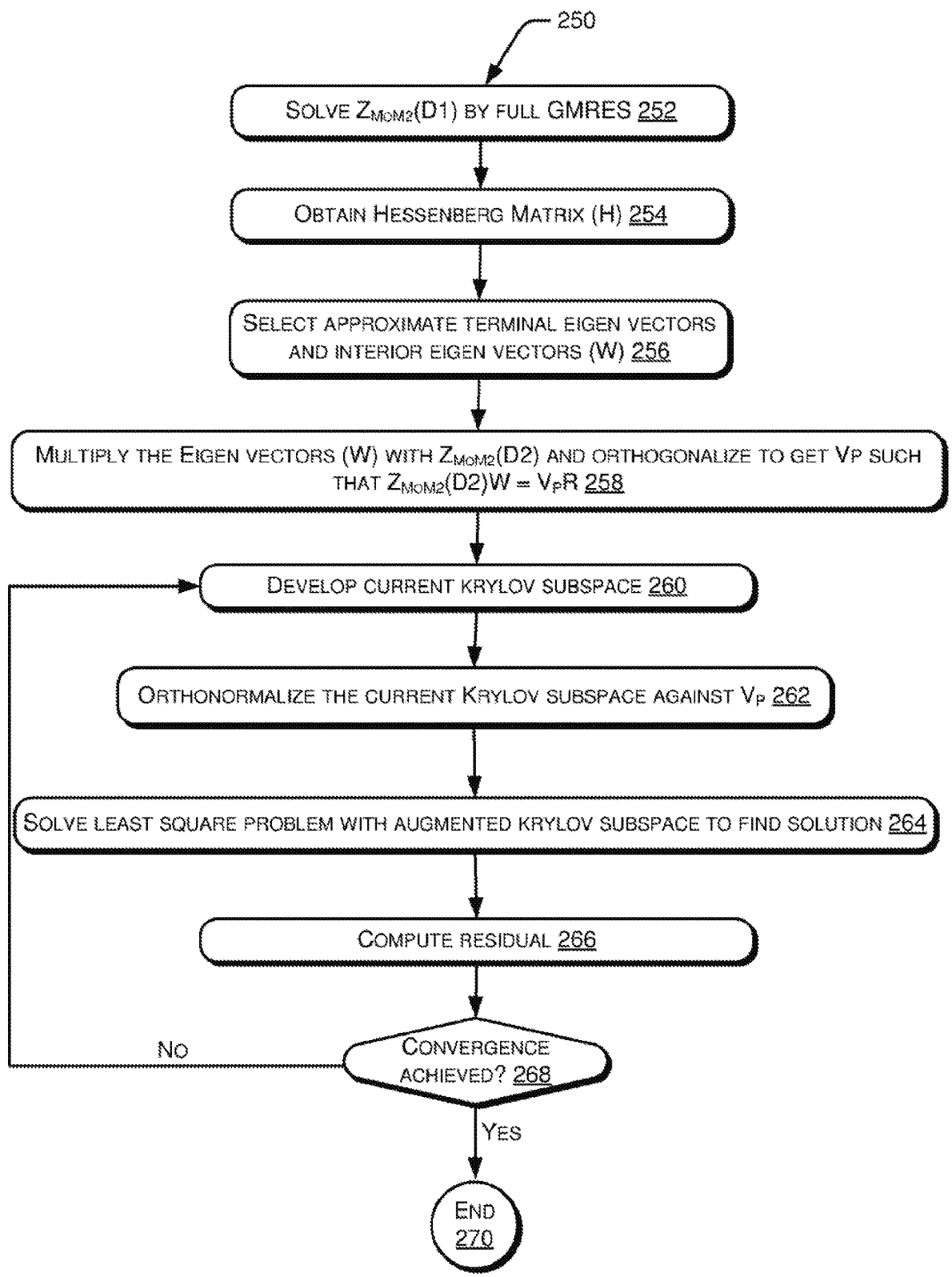
FIG. 2(b) illustrates a method for utilizing Eigen vectors from the solution of the first EM structure in the solution of the second EM structure, in accordance with an implementation of the present subject matter.

FIG. 2(b) illustrates a method 250 for utilizing Eigen vectors from the solution of a first EM structure in the solution of the second EM structure in accordance with an implementation of the present subject matter.

The order in which the method 250 is described is not intended to be construed as a limitation, and any number of the described method blocks may be combined in any order to implement the method 250, or an alternative method. Furthermore, the method 250 may be implemented by processor(s) or computing device(s) through any suitable hardware, non-transitory machine readable instructions, or a combination thereof.

It may be understood that steps of the method 250 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media.

At block 252, MoM system matrix for the first EM structure $Z_{MoM}$ (D1) is solved using a full-GMRES.

At block 254, a Hessenberg matrix (H) is obtained using Modified Arnoldi method of orthogonolization.

At block 256, approximate terminal Eigen vectors and interior Eigen vectors (W) of $Z_{MoM}$ (D1) from H corresponding to terminal eigen-values of smallest magnitude and interior Eigen vectors, respectively, are selected. The selection of the terminal Eigen vectors is performed using QZ method and the selection of interior Eigen vectors is performed using Harmonic Arnoldi method, which are explained in greater detail later.

The selective use of Eigen vectors ensures that Eigen vectors of the correct size are used for mapping into the augmented space, and therefore produces superior results in simulator speed-up.

At block 258, the Eigen vectors (W) is multiplied with $Z_{MoM}$(D2) and orthogonalized to get $V_P$ such that:

$$Z_{MoM}(D2)*W = V_P*R \quad (5)$$

Here, $V_p \in R^{n \times p}$ has orthonormal columns and $R \in R^{p \times n}$ is upper triangular.

At block 260, current Krylov subspace is generated, starting at j=1. The current Krylov subspace may be generated by the modified Arnoldi method, as explained later.

At block 262, the current Kyrlov subspace is orthonormalized against $V_p$ as below:

$$Z_{MoM}[W\ V_{p+1:p+j}]=V_{p+j+1}H \quad (6)$$

where, $V_{p+j+1}=[V_p\ V_{p+1:p+j+1}] \in R^{n \times p+j+1}$ has orthonormal columns, and the first column of the trailing n×(j+1) submatrix $V_{p+1:p+j+1}$ of $V_{p+j+1}$ is $(I-V_pV_p^T)b/\|(I-V_pV_p^T)b\|$ for this procedure. The leading principal p×p submatrix of the upper Hessenberg matrix $H \in R^{(p+j+1) \times (p+j)}$ is upper triangular matrix R in QR factorization.

At block 264, the least square problem with augmented space $_{y \in R^{p+j}}^{min}\|V_{p+j+1}^T b - Hy\|$ is solved to find solution.

$$x_j=[W\ V_{p+1:p+j}]y_j \quad (7)$$

At block 266, a residual $r_j$ is computed as per the below equation:

$$r_j=(b_j-Z_{MoM\ 2}x_j) \quad (8)$$

At block 268, it is checked whether convergence is achieved based on a threshold ε as per the below equation:

$$\frac{\|r_j\|}{\|b\|} \leq \varepsilon, \quad (9)$$

If the above equation is true, it is determined that the convergence is achieved, and the process ends at block 270. If not, the steps through 260-268 are repeated after incrementing j by 1, thereby incrementing the current Krylov subspace.

The steps 258-270 may be referred to as Eigen Augmented (EA)-GMRES.

Figure 2C:
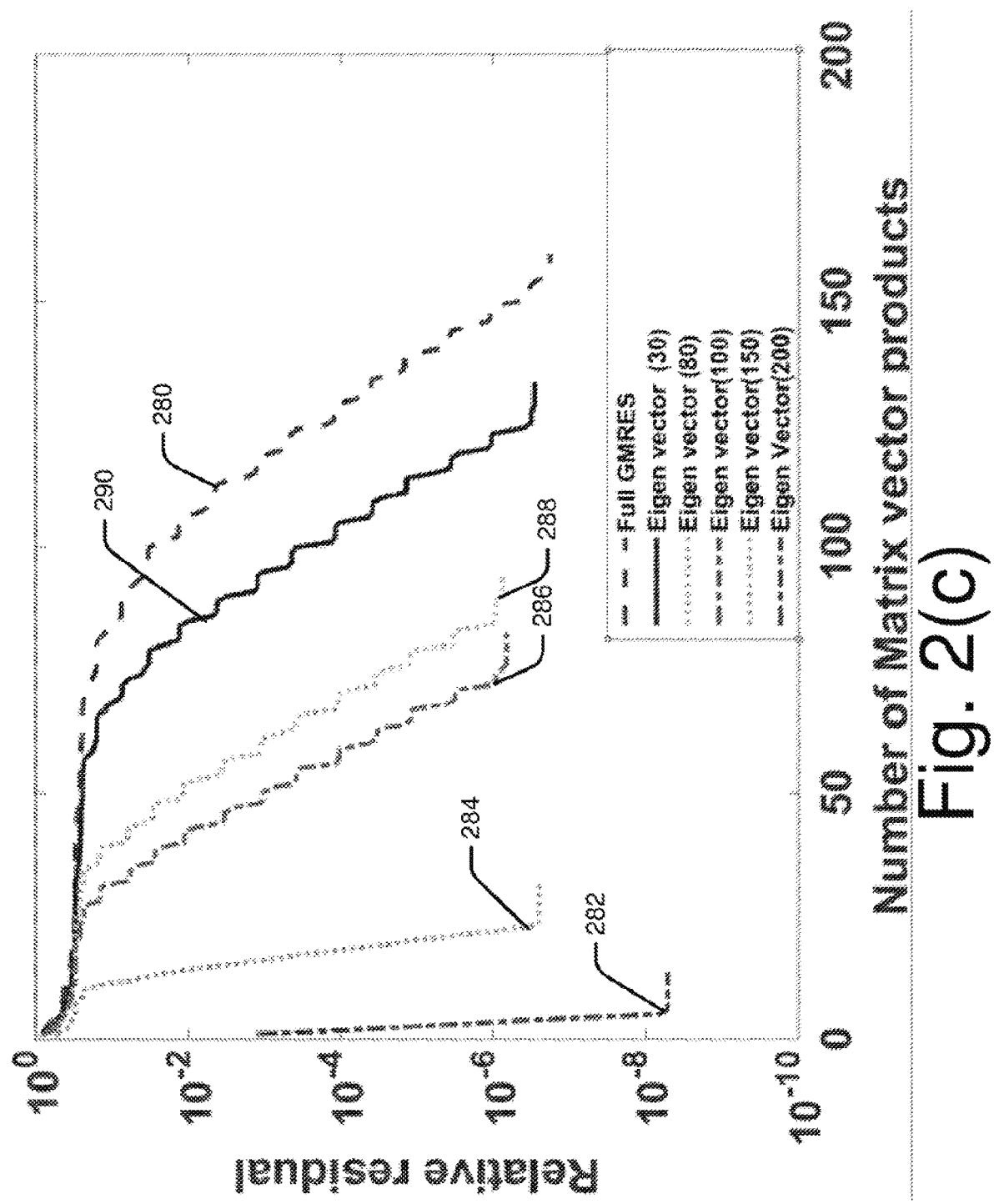
FIG. 2(c) illustrates speed-up of the EM modelling of a second EM structure due to reuse of Eigen vectors from the solution of a first EM structure, in accordance with an implementation of the present subject matter.

FIG. 2(c) illustrates speed-up of the EM modelling of a second EM structure due to reuse of Eigen vectors from the solution of a first EM structure, in accordance with an implementation of the present subject matter.

As can be seen, the use of Eigen vectors, compared to a full-GMRES solution (graph 280) of the second EM structure, provides a faster EM modelling of the second EM structure. Further, the more the number of Eigen vectors from the first EM structure reused, the faster is the convergence in the EM modelling of the second EM structure. For instance, the use of 200 Eigen vectors (graph 282) results in the faster convergence than when 150 (graph 284), 100 (graph 286), 80 (graph 288), or 30 (graph 290) Eigen vectors are used.

A system of linear equations represented by the N×N matrix A can be analysed for extraction of Eigen vectors with the nature of the Eigen relationship being as per equation below:

$$A*V=\lambda V \quad (10)$$

where λ corresponds to the Eigen value and V corresponds to the Eigen vector and <λ, V> is called an Eigen pair. There may be several Eigen vectors and Eigen values. The Eigen vectors can be categorized as terminal and interior Eigen vectors. Terminal Eigen vectors correspond to terminal Eigen values, i.e., the Eigen values of smallest magnitude and largest magnitude, while the interior Eigen vectors are the Eigen vectors corresponding to the interior Eigen values.

The extraction process for the terminal Eigen vectors and the interior Eigen vectors are exemplified below.

The terminal Eigen vectors can be extracted using a QZ extraction technique, whose steps are briefly listed below.

Let an Eigen value system be:

$$Az=\lambda z \quad (11)$$

where, A is the system matrix and λ and z are eigen vector and eigen value, respectively. Now, there exist unitary Q and Z matrix which converts A to triangular system matrix.

The eigen value problem will be converted into equivalent problem as below:

$$QAZy=\lambda QZy \quad (12)$$

where z=Zy.

The matrix A is converted into a Hessenberg form H (where the matrix is almost triangular with zeros in the upper or lower diagonals) using a set of Q and Z matrices.

Thereafter, the H matrix is converted to quasi triangular form H' by Francis implicit QR shift method known in art. H' is then converted to triangular form $H_T$.

The Eigen values from $H_T$ are found out using its triangular structure and Eigen vectors are obtained from triangular matrices and are scaled to original coordinate system (z=Z*y).

The Arnoldi Iteration is a standard method to find Eigen pair of a large non-symmetric matrix. The interior Eigen vectors and Eigen values can be extracted using the Arnoldi Iteration whose steps are briefly listed below:

Let an Eigen value system be:

$$Zz=\lambda z \quad (13)$$

where Z is the generalized system matrix of size ((N×N). Let S be the j-dimensional subspace of R", which is the subspace from which approximate eigen vectors are to be extracted. A Rayleigh-Ritz procedure may be used with the shifted and inverted operator $(z-\sigma 1)^{-1}$, where σ is the closest approximate of accurate eigen value.

The generalized Rayleigh-Ritz procedure solves the below reduced eigenvalue problem $$Q^*ZQg=\theta Q^*Qg \quad (14)$$

where Q is an n by j matrix whole columns space the subspace S. Unlike for standard Rayleigh-Ritz, Q is not required to have orthonormal columns.

For the shifted and inverted problem, applying generalized Rayleigh-Ritz gives $$Q^*(Z-\sigma I)^{-1}Qg = \frac{1}{(\theta-\sigma)}Q^*Qg \quad (15)$$

where (θ,Qg) is an approximate eigen pair of Z. This may be solved with Q representing the subspace S. To eliminate the difficulty of working with inverted operator, let us assume P have columns which spans S.

$$Q=(Z-\sigma I)P \quad (16)$$

Replacing value of Q from equation (16) to equation (15), $$P^*(Z-\sigma I)^*Pg = \frac{1}{(\theta-\sigma)}P^*(Z-\sigma I)^*(Z-\sigma I)Pg \quad (17)$$

The above is the reduced eigen value problem. The Arnoldi Method is a standard way to find eigen pair of a large non-symmetric matrix. The Arnoldi iteration for matrix (Z−σI) can be represented as $$(Z-\sigma I)P=PG+\beta_j p_j+e_j^* \quad (18)$$

where P is an n by j orthonormal matrix with columns spacing a Krylov subspace of dimension j, $p_{j+1}$ will be $(j+1)^{th}$ column of P, G is a j by j upper-Hessenberg Matrix and $\beta_j$ will be (j+1, j) entry of next G.

With help of equations (17) and (18), the below eigen value problem is obtained $$G^*g = \frac{1}{(\theta - \sigma)}(G^*G + \beta^2 e_j e_j^*)g \quad (19)$$

The generation of Krylov subspace by modified Arnoldi method involves the below logic:

```
for j = 1, 2, ..., compute {
    for i = 1, 2, ..., j {
        g_{i,j} = (p_i, (Z - σI)* p_j)
    }
    p̂_{j+1} = (Z - σI)*p_j - Σ_{i=1}^{j} g_{ij} p_i
    g_{j+1,j} = || p̂_{j+1} ||
    p_{j+1} = p̂_{j+1}/β_j
}
```

The above explained iterative flow is similar to Modified Gram-Schmidt technique, which is known in the art, and will not be explained for the sake of brevity.

Figure 3A:
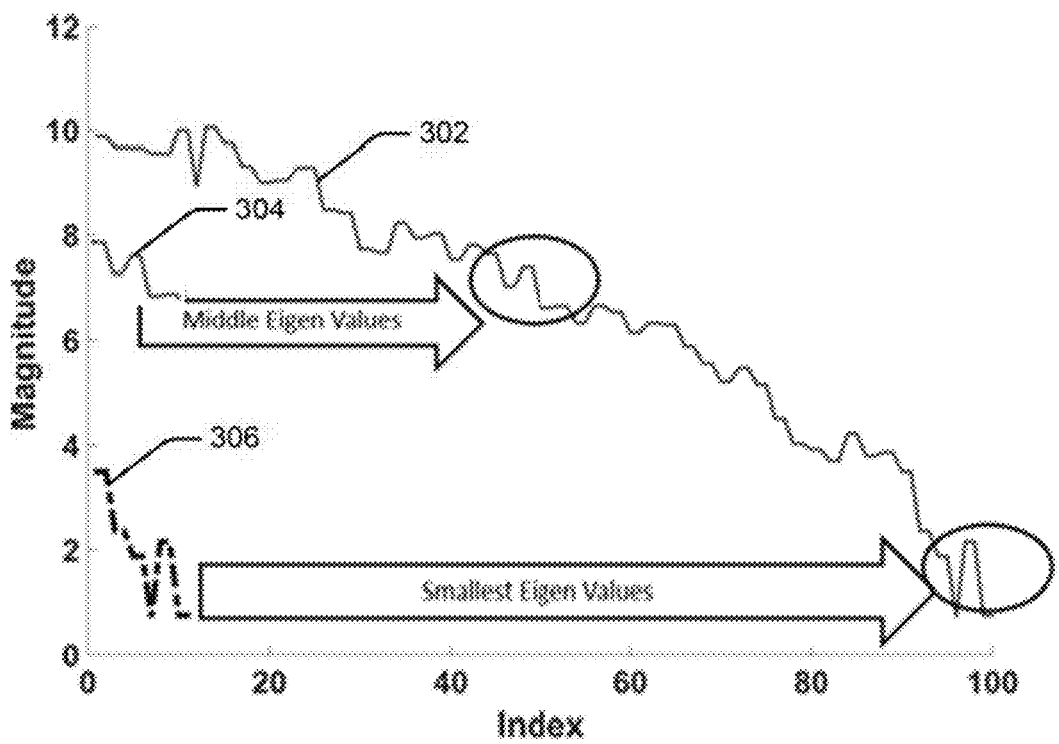
FIG. 3(a) illustrates the complete range of Eigen vectors that can be extracted, in accordance with an implementation of the present subject matter.

The transformed equation (19) is then solved using the steps of the QZ extraction for the Eigen-pairs with largest magnitude of $1/(\theta-\sigma)$ FIG. 3(a) illustrates the complete range of Eigen vectors that can be extracted by using a combination of the Arnoldi iteration and the QZ methods described above, in accordance with an implementation of the present subject matter. Here, the graph 302 represents the entire Eigen spectrum. The medium magnitude Eigen values, also referred to as interior Eigen values, are represented by the graph 304. The Eigen vectors corresponding to the interior Eigen values can be extracted using the Arnoldi iteration. The small magnitude Eigen values are represented by the graph 306. The Eigen vectors corresponding to the small magnitude Eigen values can be extracted using the QZ method.

Figure 3B:
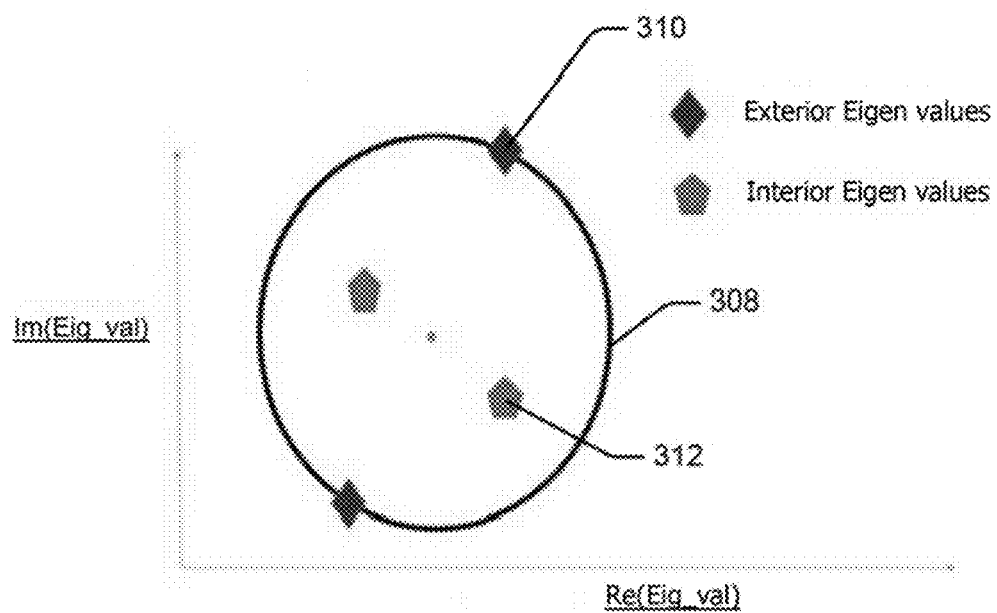
FIG. 3(b) illustrates terminal and interior Eigen values in an Eigen spectrum in a complex plane, in accordance with an implementation of the present subject matter.

FIG. 3(b) illustrates the terminal and interior Eigen values in an Eigen spectrum in a complex plane, in accordance with an implementation of the present subject matter. As illustrated, the Eigen spectrum is in the shape of a disc 308 in the complex plane. Here, the terminal Eigen values are the Eigen values that lie on the perimeter of the disc 308, such as the Eigen value 310. The interior Eigen values are the ones that lie anywhere between the centre of the disc 308 and the perimeter of the disc 308, such as the Eigen value 312.

In an implementation, upon extraction of the Eigen vectors corresponding to the terminal and interior Eigen values, the Eigen values can be sorted based on their magnitude. Thereafter, the Eigen vectors whose corresponding Eigen values are small or medium are selected for augmenting the Krylov subspace. The selection of the small and medium Eigen vectors can be performed based on the number of small and medium Eigen vectors to be used for the augmentation. For example, if 50 small Eigen vectors are to be utilized, the Eigen vectors corresponding to the smallest 50 Eigen values are selected. Similarly, if 50 middle Eigen vectors are to be selected, the Eigen vectors corresponding to the smallest 50 interior Eigen values (Eigen values lying between the centre and the perimeter of the disc 308) can be selected.

In general, small Eigen vectors refers to Eigen vectors corresponding to a predetermined number of the smallest Eigen values amongst the determined Eigen values. Similarly, large Eigen vectors refers to Eigen vectors corresponding to a predetermined number of the largest Eigen values amongst the determined Eigen values. Medium Eigen vectors refers to Eigen vectors corresponding to a predetermined number of the smallest interior Eigen values amongst the determined interior Eigen values. The predetermined number of Eigen values (50 in the above example) to be used, in turn, can be determined based on the desired speed-up in the solving.

A combination of Eigen vectors selected from the ranges 304 and 306 may be used to augment the Krylov subspace of the earlier solved EM structure, such as the first EM structure 102. Such a method can fully extract the advantage of both small terminal and interior Eigen vectors from the original EM structure.

Figure 3C:
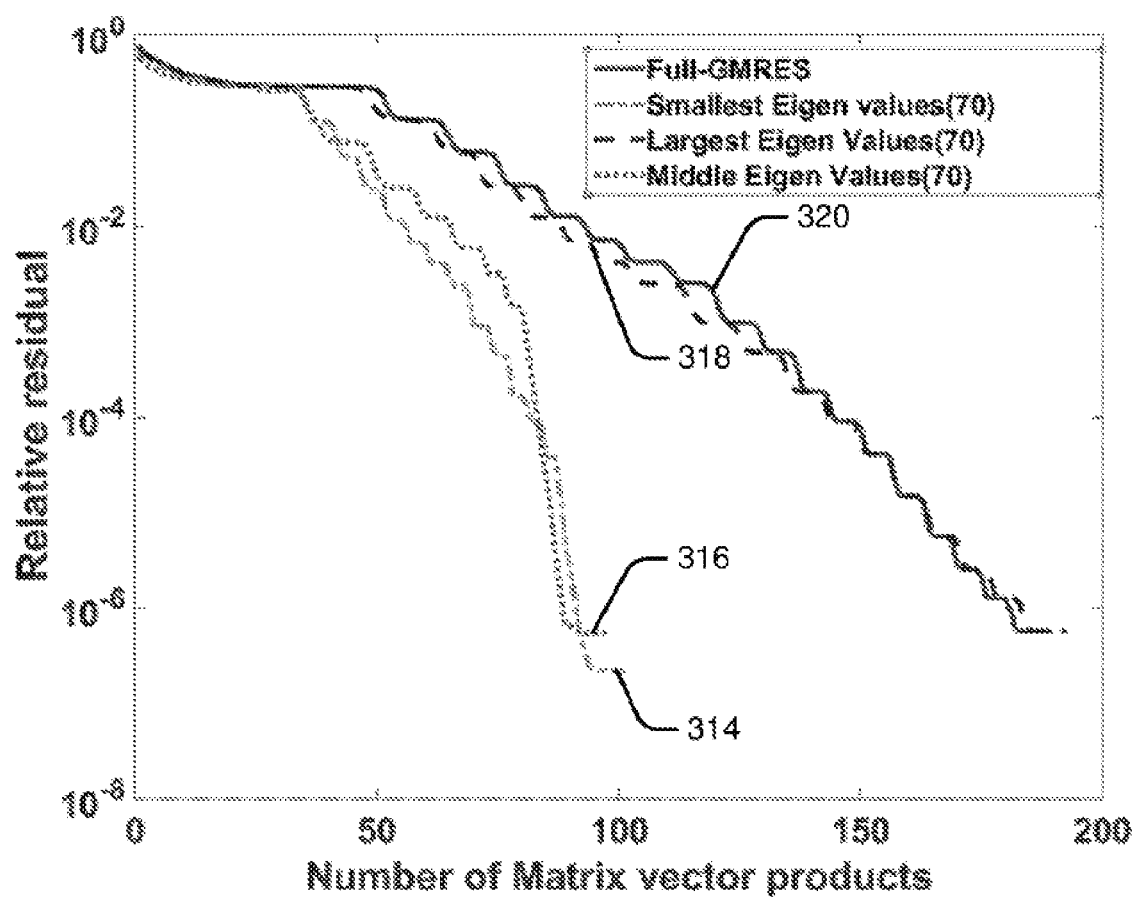
FIG. 3(c) illustrates the convergence speed-up obtained upon using Eigen vectors corresponding to small, medium, and large Eigen values, in accordance with an implementation of the present subject matter.

FIG. 3(c) illustrates the convergence speed-up obtained upon using Eigen vectors corresponding to small, medium, and large Eigen values, in accordance with an implementation of the present subject matter.

As can be seen, the Eigen vectors corresponding to small Eigen values (illustrated by graph 314), and the Eigen vectors corresponding to medium Eigen values (illustrated by graph 316) are more effective in speeding-up the iterative convergence, while the Eigen vectors corresponding to large Eigen values (illustrated by graph 318) do not enable faster iterative convergence.

An assumption in the conventional GMRES method and EA-GMRES method is that a partial and approximate Krylov subspace for M2 can be built from the Krylov subspace of M1. While such an assumption is true if the mesh structure on M1 is same as that of M2, if the mesh structure of M2 is different from that of M1, the Krylov subspace of M1 will no longer be an approximate representation of that of M2. Since there may be a surface contour change in M2, the surface division into mesh will provide a modified mesh structure. In other words, the mesh structure of M2 will be different from that of M1.

FIGS. 4(a) and 4(b) illustrate a case in which, while the geometrical properties of the EM structures 102 and 104 are similar, the mesh structure M1 of the first EM structure 102 is significantly different from the mesh structure M2 of the second EM structure 104. Therefore, any Eigen vector data used from the simulation of the first EM structure 102 in the simulation on the second EM structure 104 would not aid in faster convergence of the GMRES process.

In order to utilize the Eigen vector data from the simulation of D1 on D2 even if the mesh structures of the two EM structures are different, the present subject matter utilizes a mesh interpolation technique. The mesh interpolation technique enables using EA-GMRES in cases where the mesh structure of the design variant is different from the already EM modelled and simulated EM structure.

Figures 5A, 5B:
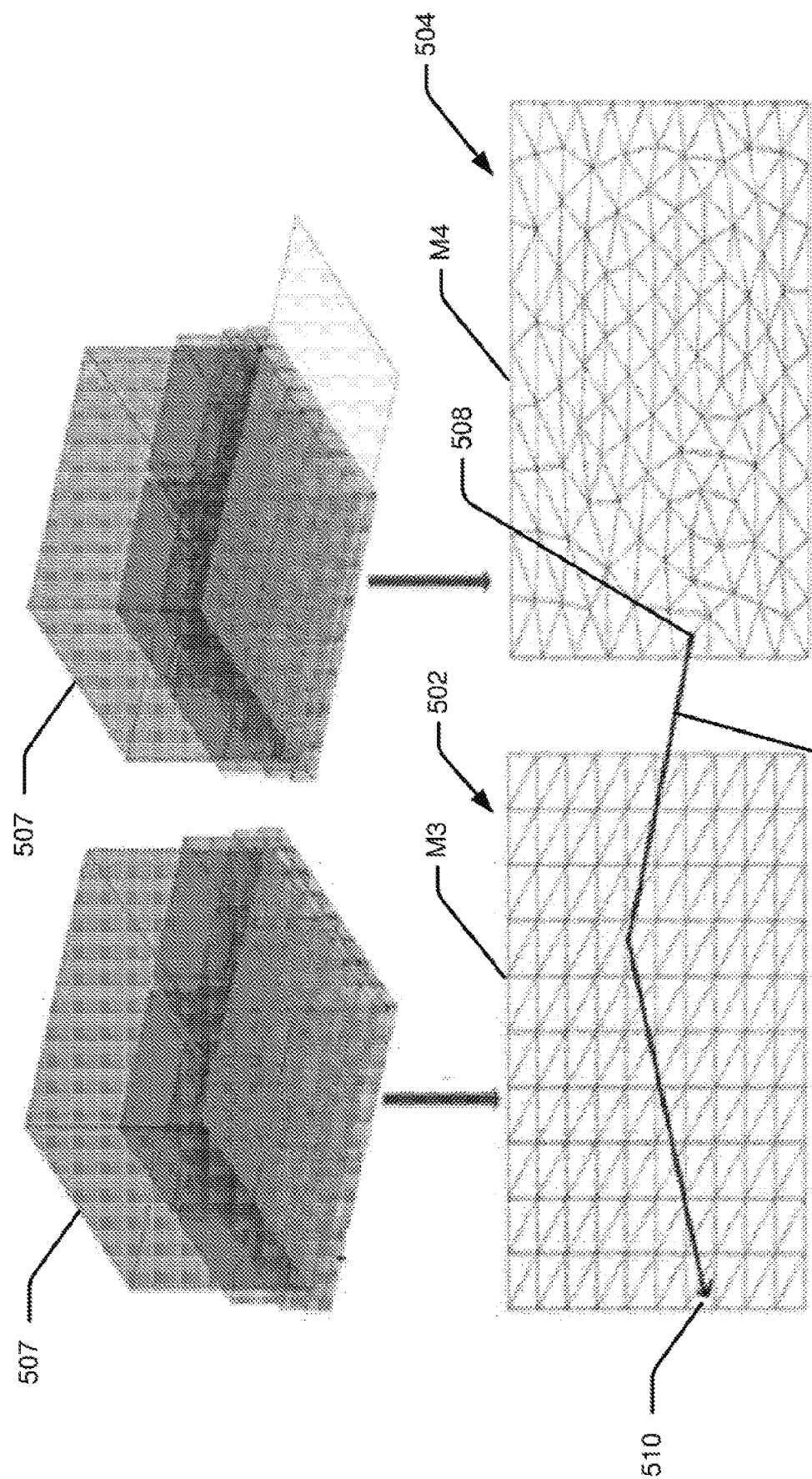
FIGS. 5(a), 5(b), 5(c), and 5(d) illustrate a mesh interpolation technique, in accordance with an implementation of the present subject matter.

FIGS. 5(a) and 5(b) illustrate the mesh interpolation technique, in accordance with an implementation of the present subject matter. In this illustration, M3 represents a third mesh structure for a third EM structure 502 and M4 represents a fourth, different mesh structure for a fourth EM structure 504 that is a design variant of the third EM structure 502. The third EM structure 502 is already EM modelled and simulated, similar to the first EM structure 102, while the fourth EM structure 504 is a design variant of the third EM structure 502 and yet to be EM modelled and simulated, similar to the second EM structure 104. The third and fourth EM structures have different mesh structures.

For every current vector in M3, there exists a current vector in M4, and therefore, the mesh current matrix for M4 can be reframed in terms of the mesh current matrix for M3 through a linear transformation 506.

For efficient mesh interpolation, a tree structure is generated by encompassing the entire geometry of the third EM structure 502 inside a cube 507 followed by recursive splitting of each cube into eight children cubes until an optimal number of levels are reached, as would be understood by a person skilled in the art. This is called an oct-tree decomposition. As is understood, a level that is not further split is called the leaf level. The leaf level cubes corresponding to this multilevel oct-tree-based hierarchical decomposition of the third EM structure 502 are used for the mesh interpolation. An oct-tree decomposition is also performed for the fourth EM structure 504 using the cube 507 to obtain the current matrix M4. The current vectors of M3 are then transformed into current vectors of M4 by interpolation.

Figure 5C:
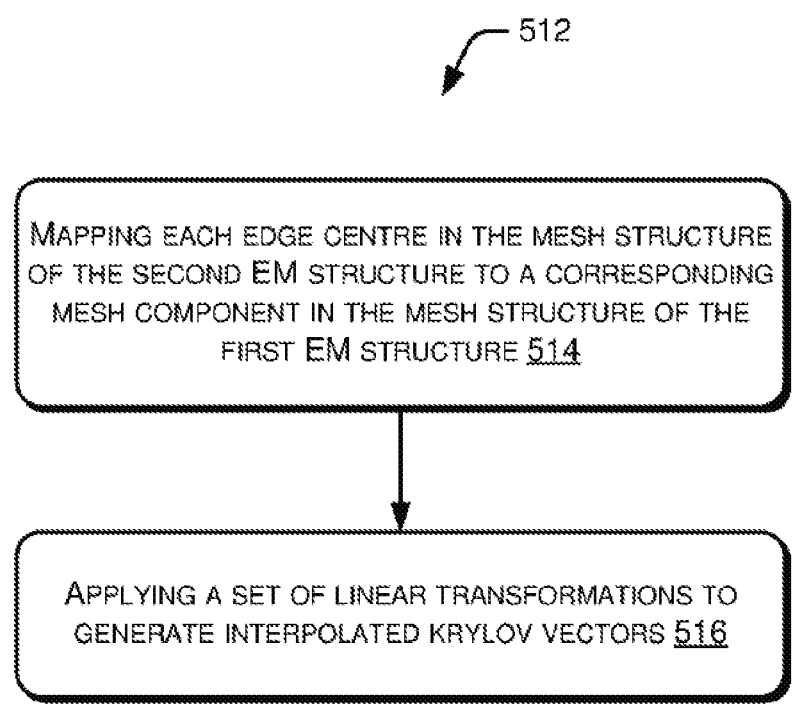

FIG. 5(c) illustrates a method 512 for mesh interpolation, in accordance with an implementation of the present subject matter.

The order in which the method 512 is described is not intended to be construed as a limitation, and any number of the described method blocks may be combined in any order to implement the method 512, or an alternative method. Furthermore, the method 512 may be implemented by processor(s) or computing device(s) through any suitable hardware including embedded hardware, FPGA, array of micro-controllers, non-transitory machine readable instructions, or a combination thereof.

It may be understood that steps of the method 512 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media.

At block 514, each edge centre 508 in the mesh structure M4 of the fourth EM structure 504 is mapped to a corresponding mesh component in the mesh structure M3 of the third EM structure 502.

At block 516, a set of linear transformations 506 is applied to generate interpolated Krylov vectors.

The above steps of the method 512 will be explained in greater detail in the subsequent paragraphs.

In an implementation, the linear transformation 506 can be performed by mapping edge centres within a leaf level cube in M4 with corresponding mesh components on M3. For example, an edge centre 508 in M4 may be mapped on to triangle 510 in M3. The mapping can be performed as below.

The current density $J_S$ at a mapped location for a particular edge-centre on M4 is evaluated using the below equation:

$$\vec{J}_S^{M3} = \frac{1}{2A^{M3}} \sum_{n=1}^{Nb} c_n^{M3} \vec{\rho}_n^{M3} l_n^{M3} \quad (20)$$

Here, n takes the contribution over all RWG basis (Nb) functions associated with a triangle of M3 with area $A^{M3}$ on which the edge-centre of M4 is mapped. The RWG bases have length $l_n$, position vector $\rho_n$ from the free vertex to the mapped location, and are associated with a known coefficient $c_n$ obtained from Left Hand Side (LHS) solution, X, of the matrix problem A*X=b. Thereafter, the interpolated coefficients for the mesh M4 are obtained using the below equation:

$$c_i^{M4} = \vec{n}_i^{M4} \cdot \vec{J}_{si}^{M3}, \text{ for all } i=1 \text{ to } M \quad (21)$$

where, i is the index of an RWG edge for mesh M4, M is the number of RWG edges in M4, and the dot product signifies the component of $J_S$ normal to the edge. The interpolation technique is dependent on the type of Basis function used.

Figure 5D:
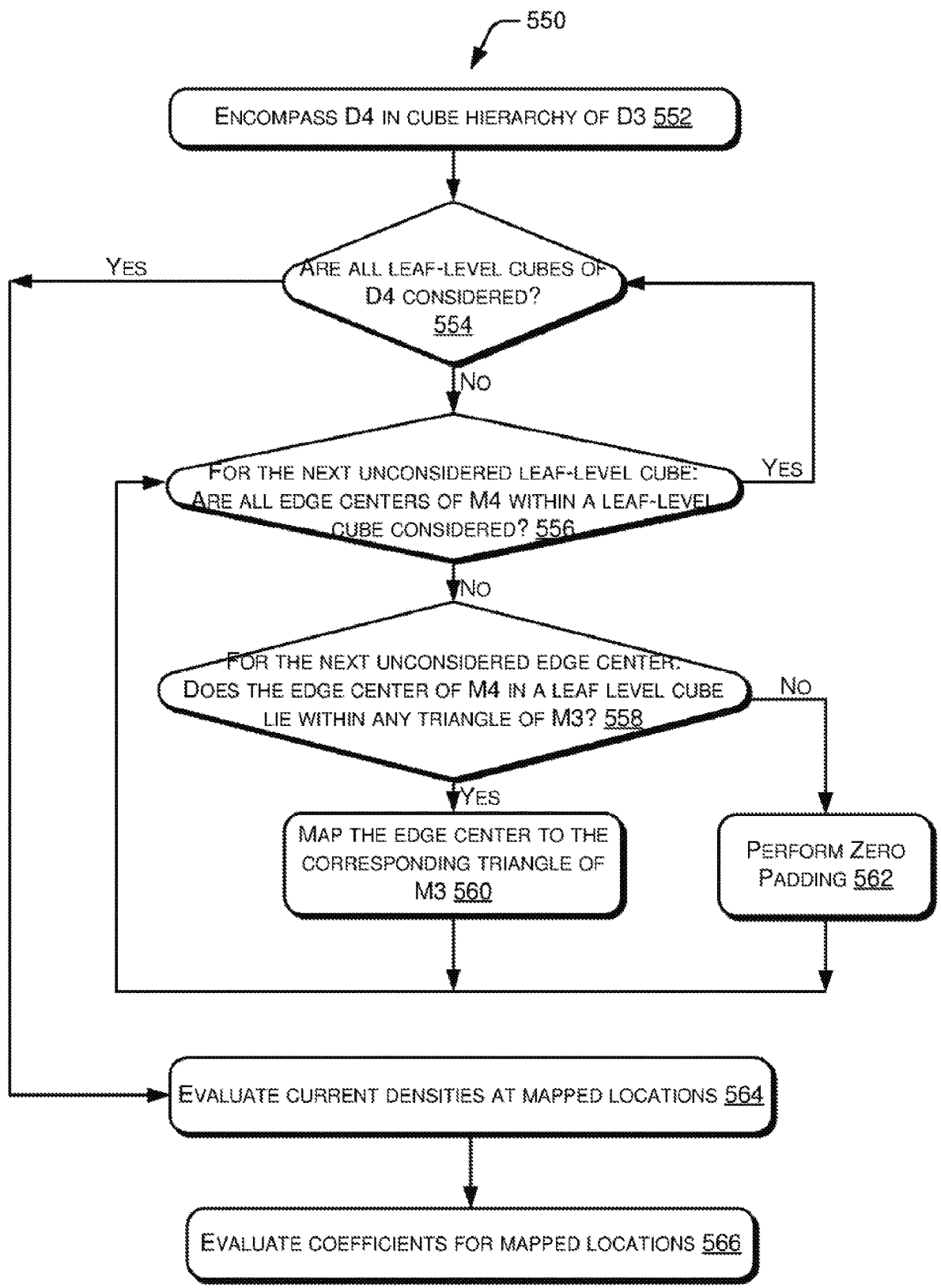
Figure 5E:
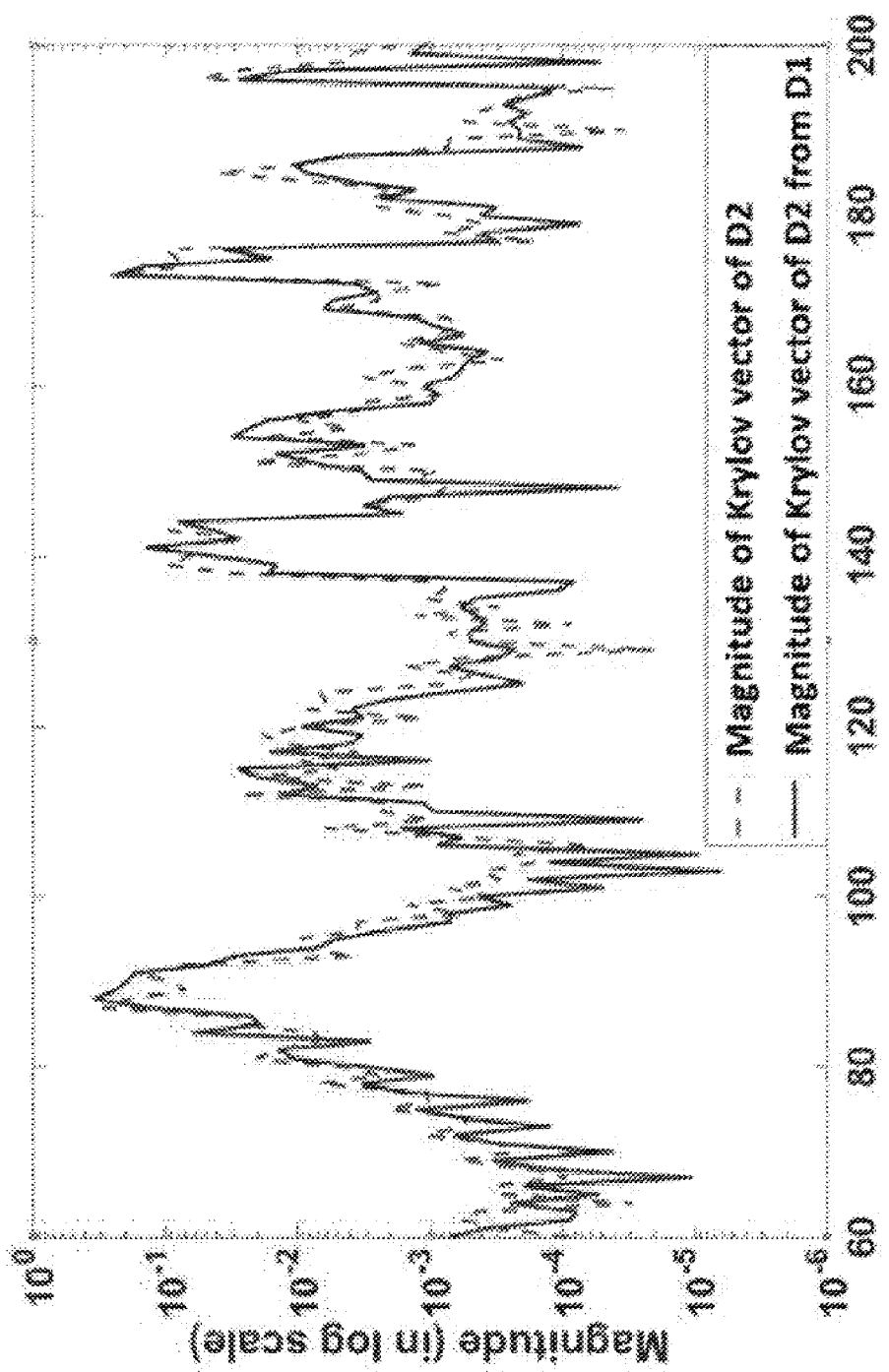
FIG. 5(e) illustrates a comparison of magnitude of the mesh interpolated Krylov vectors with actual Krylov vectors, in accordance with an implementation of the present subject matter.

FIG. 5(d) illustrates a method 550 of mesh interpolation, in accordance with an implementation of the present subject matter.

The order in which the method 550 is described is not intended to be construed as a limitation, and any number of the described method blocks may be combined in any order to implement the method 550, or an alternative method. Furthermore, the method 550 may be implemented by processor(s) or computing device(s) through any suitable hardware including embedded hardware, FPGA, array of micro-controllers, non-transitory machine readable instructions, or a combination thereof.

It may be understood that steps of the method 550 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media.

At block 552, the fourth EM structure 504, also referred to as D4, is encompassed in the cube hierarchy 507 of the third EM structure 502, referred to as D3, as illustrated in FIG. 5(b).

At block 554, a check is made as to whether all leaf-level cubes of D4 are considered. If not considered, at block 556, for a leaf-level cube that is not considered, a check is made as to whether all edge centres within each leaf-level cube is considered.

If it is determined that all edge centres are not considered, at block 558, for an edge centre of M4 in a leaf level cube not considered, a determination is made as to whether the edge centre lies within the cube in M3. An edge centre of M4 may not lie within the cube in M3 if D4 is an extended version of the D3 and the edge centre lies in a portion of D4 that is absent in D3.

If the edge centre lies within a triangle in M3, at block 560, the edge-centre is mapped to the appropriate triangle in M3, such as the mapping of the edge centre 508 with the triangle 510. If the edge centre of M4 falls outside the cube in M3, at block 562, zero-padding is performed for that edge centre. In general, if it is determined that the edge centre does not have a corresponding mesh component in the first EM structure, a zero padding is provided for that edge centre.

Upon completion of operations at block 560 and 562, the process returns to block 556, where it is determined if all edge-centres of D4 in the leaf level cube have been considered.

If, at block 556, it is determined that all edge-centres within the leaf level cube have not been considered, the operations at blocks 558 and 560/562 are carried out for the unconsidered edge centres in the leaf level cube.

In contrast, if it is determined that all edge-centres within the leaf level cube have been considered, the process returns to block 554, where it is determined if all the leaf level cubes of D4 are considered. If yes, at block 564, current densities at the mapped locations are evaluated using equation (20). Thereafter, at block 566, coefficients on M4 are evaluated using equation (21).

The above steps of the mesh interpolation technique may be performed by a simulator system as matrix operations in a computational environment. Consider that m and n represent the number of RWG basis functions for M4 on D4 and M3 on D3 respectively. If $I_N$ represents the coefficients of RWG bases for D3 after explicit MoM solution and $I_M$ represents the interpolated coefficients of RWG basis for D4 obtained by the mesh interpolation process from $I_N$, the mesh interpolation matrix transformation can be computed as:

$$[I_M]_{m \times 1} = [Z_{INT}]_{n \times n} [I_N]_{n \times 1} \quad (22)$$

where $Z_{INT}$ is a sparse matrix with three elements per row for closed bodies. Consider $T_x$ to be the $x^{th}$ triangle on mesh M3 of base design D3 with an area $A_x$. Let $R_i$ be the $i^{th}$ RWG edge on mesh M4 with edge-normal unit vector $n_i$, and $R_j$ be the $j^{th}$ RWG edge of length $l_j$ on mesh M3. The elements of $Z_{INT}$ are given by the computation:

$$Z_{INt}(i,j) = \begin{cases} \hat{n}_i \cdot k \frac{\rho_j l_j}{2A_x} & \text{if edge-center of } R_i \text{ maps on to } T_x, \\ & \text{with } R_j \text{ as contributing basis} \\ 0 & \text{otherwise} \end{cases} \quad (23)$$

where $\rho_j$ is the vector from the free-vertex to the mapped coordinate in $T_x$ corresponding to edge-centre of $R_i$ and k is given by:

$$k = \begin{cases} +1 & \text{if } T_x \text{ is the positive triangle for } R_j \\ -1 & \text{if } T_x \text{ is the negative triangle for } R_j \end{cases} \quad (24)$$

The mesh interpolation technique as described above can be used to interpolate Krylov vectors. For this, instead of using the solution vector of D3, the Krylov vectors of D3 can be used to generate approximate Krylov vectors for D4 using the mesh interpolation technique. The interpolated Krylov vectors can be used to generate interpolated Eigen vectors for augmentation to a Krylov subspace of D4. The generation of interpolated Eigen vectors from the interpolated Krylov vectors will be explained later.

FIG. 5(*e*) illustrates a comparison of magnitude of the mesh interpolated Krylov vectors with actual Krylov vectors, in accordance with an implementation of the present subject matter. The mesh interpolation technique is performed for the Krylov vectors of the first EM structure 102 to obtain mesh interpolated Krylov vectors for the second EM structure 104. They are then compared with the actual Krylov vectors of the second EM structure 104 which are independently computed from Krylov subspace. As can be seen, the mesh interpolated Krylov vectors closely resemble the ones independently generated. Therefore, the mesh interpolation will aid in convergence faster when used for solving the second EM structure 104.

Figure 6A:
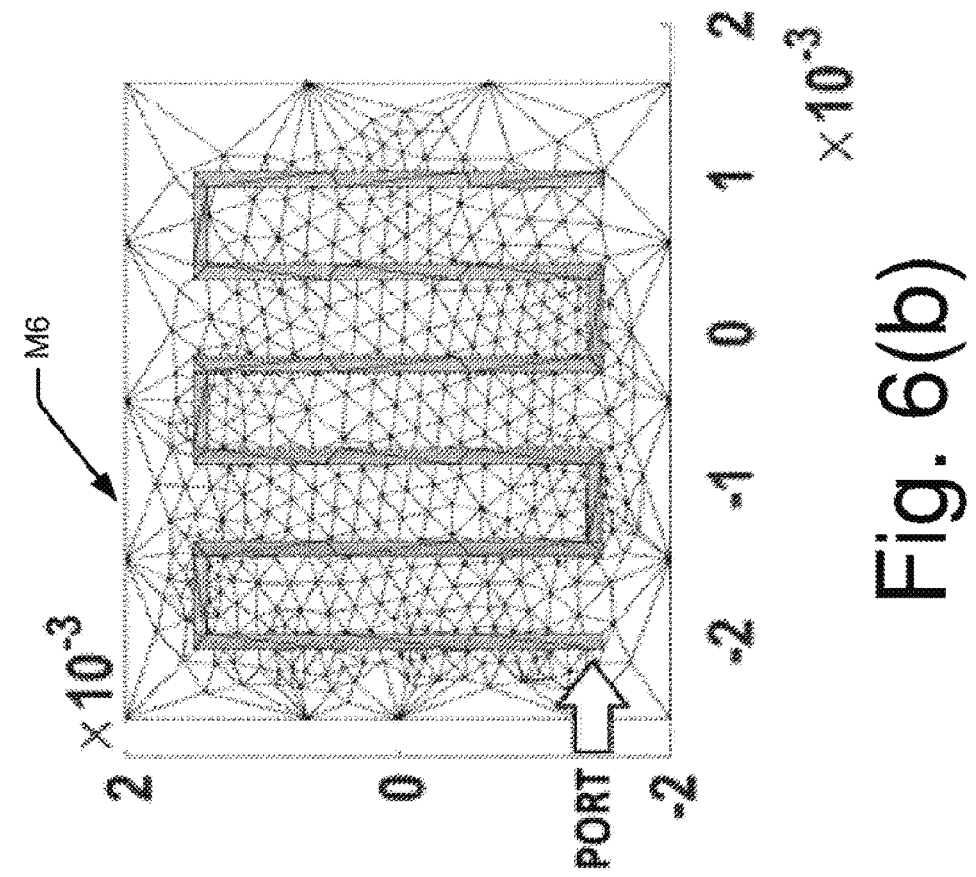
FIGS. 6(a) and 6(b) illustrate applications of mesh interpolation on the same structure but with different mesh, in accordance with an implementation of the present subject matter.
Figure 6B:
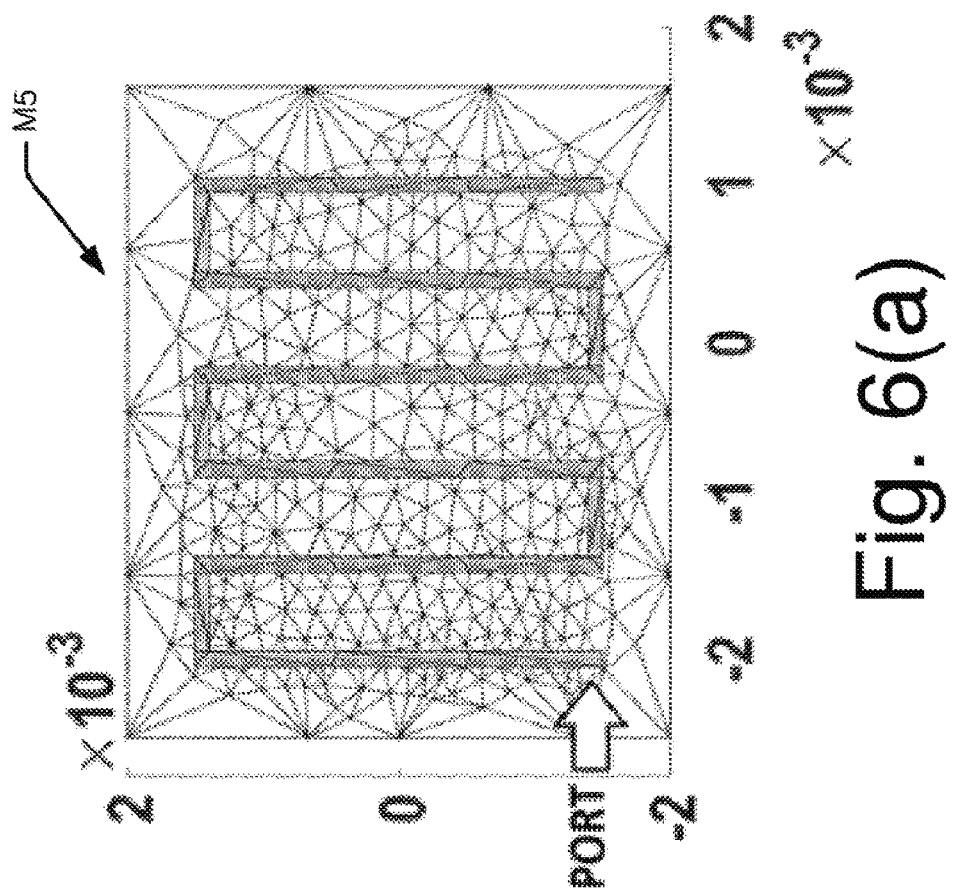

FIGS. 6(*a*) and 6(*b*) illustrate applications of mesh interpolation, in accordance with an implementation of the present subject matter. Here, a GHz port meander track line in a printed circuit board (PCB) is considered for mesh interpolation with different mesh structures M5 and M6 in FIG. 6(*a*) and FIG. 6(*b*), respectively. In this case, the MoM system matrix corresponding to M5 is first solved using a regular fast iterative GMRES solution. The mesh count of M5 is then increased by 30% to get a new mesh M6. The current density obtained from the solution of M5 is next interpolated using (20) and (21) to obtain the coefficients of RWG basis on M6. The mesh interpolation technique can be used for compensating for the change in the mesh structures, as described above, and then EA-GMRES can be performed to ensure a faster solution of the design variant.

FIGS. 7(*a*), 7(*b*), and 7(*c*), illustrate some EM structures that can be subjected to EM modelling using techniques of the present subject matter, in accordance with some implementations of the present subject matter. FIG. 7(*a*) illustrates triangular meshing on the surface of an electronic packaging structure 702 that can be EM modelled. Using techniques of the present subject matter, the electronic packaging structure 702 can be EM modelled and simulated to ensure EMC and a minimal EMI. FIG. 7(*b*) illustrates triangular meshing on the surface of an aerial vehicle 704 that can be EM modelled. FIG. 7(*c*) illustrates triangular meshing on the surface of a terrestrial vehicle 706 that can be EM modelled. Using techniques of the present subject matter, the aerial vehicle 704 and the terrestrial vehicle 706 can be EM modelled and simulated to ensure their radar detectability.

The methods of the present subject matter speed up solving of the mesh equations considering that each of these illustrated EM structures are design variants of previously solved EM structures that may be smaller in geometric sizing and modified shapes on the surface contours.

As mentioned earlier, the steps involved in the mesh interpolation technique explained with reference to FIGS. 5(*a*), 5(*b*), 5(*c*), 5(*d*) and equation (22) can be used to interpolate the Krylov vectors. In an implementation, the Krylov subspace of the second EM structure is augmented with the interpolated Krylov vectors to form an augmented Krylov subspace. Thereafter, the Maxwell's equations for the second EM structure are solved using this augmented Krylov subspace. The solution of the Maxwell's equations can be performed using the GMRES method, as briefly explained above. Such a method of augmenting the Krylov subspace of the second EM structure and using this augmented Krylov subspace for solving Maxwell's equations may be referred to as mesh interpolated Krylov Recycling (MIKR) method.

Figure 8:
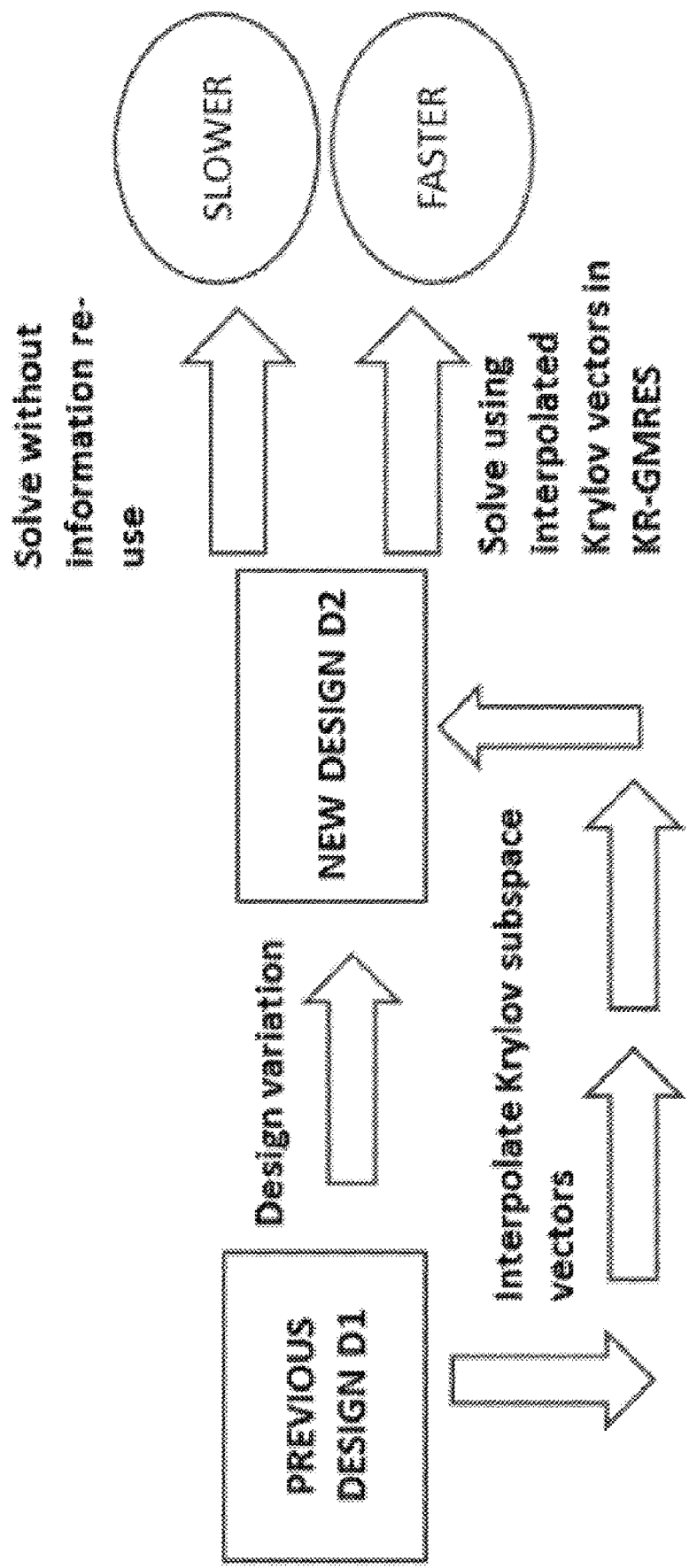
FIG. 8 illustrates a Mesh Interpolated Krylov Recycling (MIKR) method, in accordance with an implementation of the present subject matter.

FIG. 8 illustrates a schematic flow of the MIKR method, in accordance with an implementation of the present subject matter. The MIKR methodology can be applied to obtain the solution of a design variant D2, such as the second EM structure 104, of another EM structure D1, such as the first EM structure 102, as explained above.

In an implementation, the mesh-interpolated Krylov vectors are re-orthogonalized (transformed into a new equivalent set of mutually perpendicular vectors in the N dimensional subspace using methods similar to the Gram-Schmidt process known in art) and augmented in the Krylov subspace of D2 for solving the Maxwell's equations using GMRES solution.

The augmentation of the Krylov subspace as performed in the MIKR method provides a faster solving of D2. The faster solving is illustrated with the help of another EM structure in FIG. 9(*a*) and FIG. 9(*b*).

FIGS. 9(*a*), 9(*b*), and 9(*c*) illustrate faster convergence in the solving of an extended EM structure due to the MIKR method, in accordance with an implementation of the present subject matter. Here, FIG. 9(*a*) illustrates a first via (an electrical connection between layers in a physical electronic circuit that goes through an insulating layer plane between one or more adjacent layers) structure of the circuit plane 902 over ground plane that is considered in a GHz PCB routing design.

FIG. 9(b) illustrates a second via structure circuit plane 904 that is a design variant of the first via structure circuit plane 902. As illustrated, the second via structure circuit plane 904 includes two vias 906 and 908, as opposed to a single via 910 of the first via structure 902. Therefore, the second via structure 904 can be considered as an extended EM structure. Table-I shows the physical dimensions of layout used in this example.

TABLE I

PHYSICAL DIMENSIONS OF LAYOUT

| Physical Parameter | Description | value |
|---|---|---|
| L1 | Initial trace length | 1 mm |
| P | Pad diameter | 1 mm |
| L2 | Post pad trace length | 1 mm |
| $V_D$ | Via diameter | 1 mm |
| $S_D$ | Shorting stub diameter | 0.5 mm |
| H | Substrate height | 1 mm |
| $T_H$ | Height of trace above ground | 0.2 mm |
| W1 | Trace width | 1 mm |

The second via structure 904 is simulated using the proposed MIKR solver for all frequency points with lumped port as excitation.

Figure 9C:
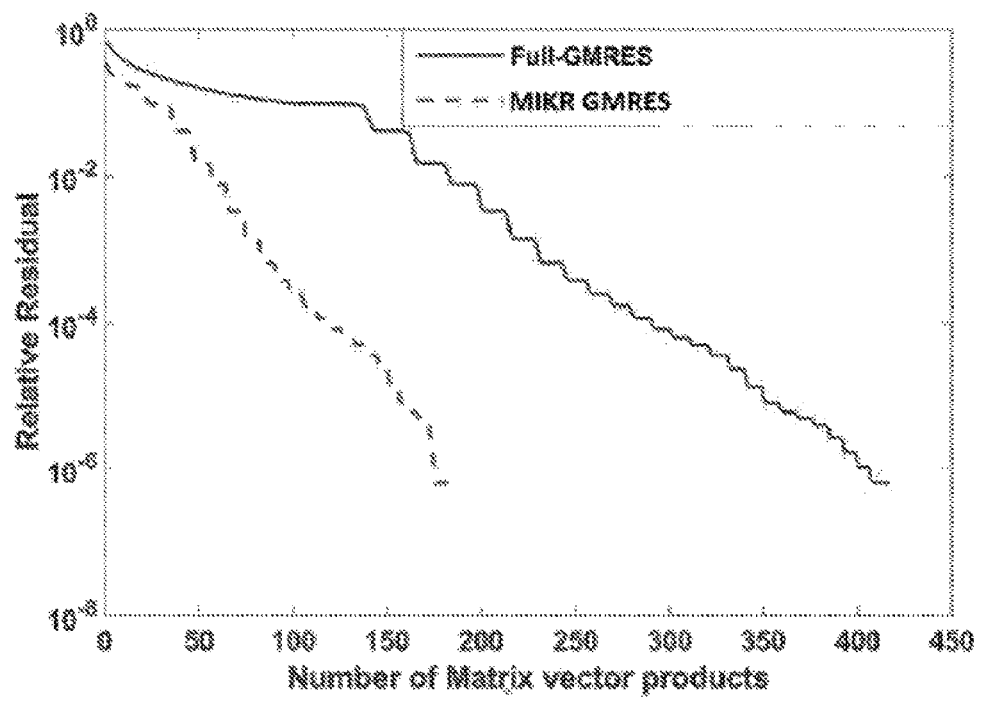

The performance comparison between regular GMRES with zero initial guess and the proposed MIKR method is illustrated for the solution at 1 GHz in FIG. 9(c). A relative residual threshold of $10^{-9}$ is used for both cases. It can be observed that the residual decay rate for MIKR is much steeper compared to regular GMRES. The performance metrics are tabulated in Table II, where p represents the number of matrix vector products required for convergence. A speedup of ~2.5× is observed for MIKR over normal GMRES.

TABLE II

PERFORMANCE OF MIKR-GMRES COMPARED TO FULL-GMRES FOR VIA-STRUCTURE DESIGN VARIANT

| Design variant | Structure | Number of RWG edges | Full GMRES (p) | MIKR (p) |
|---|---|---|---|---|
| D1: Base | Single via | 5845 | 350 | — |
| D2 | Cascaded two-via | 7525 | 425 | 175 |

Figure 9D:
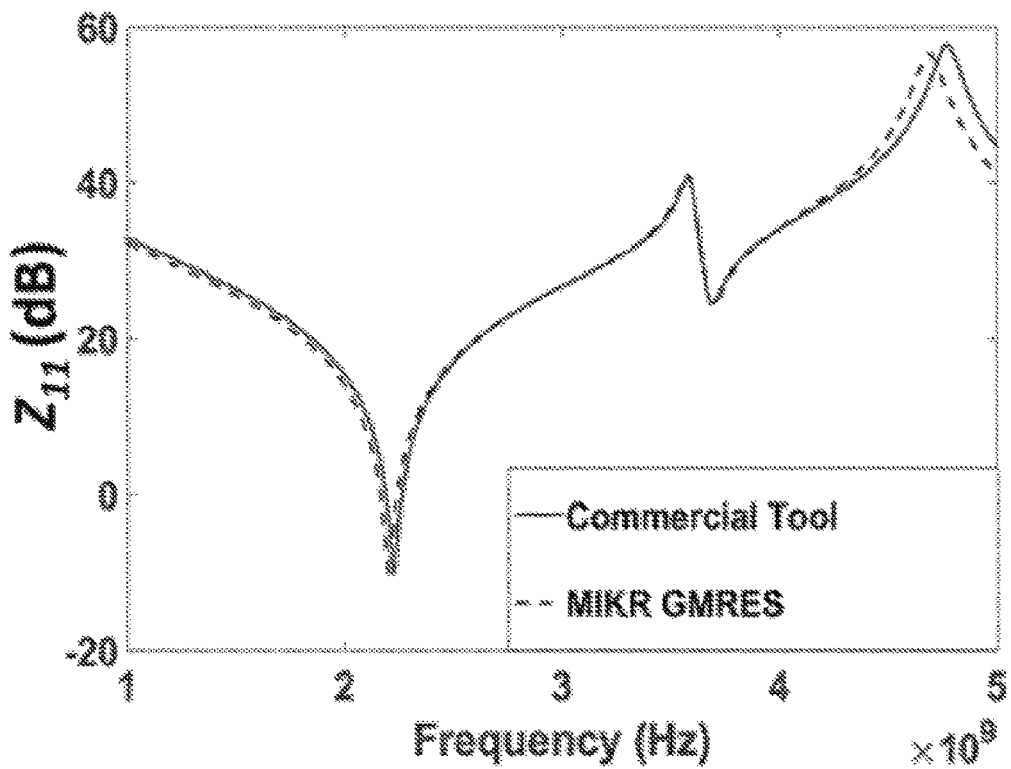
FIG. 9(d) illustrates comparison of results obtained using MIKR-Generalized Minimal Residual (GMRES) and results obtained using a conventional GMRES performed by a commercial tool, in accordance with an implementation of the present subject matter.

FIG. 9(d) illustrates comparison of results obtained using MIKR-GMRES and results obtained using a conventional GMRES performed by a commercial tool, in accordance with an implementation of the present subject matter. MIKR-GMRES refers to performing a GMRES operation after augmenting the Krylov subspace of the second via structure 904 with interpolated Krylov vectors of the first via structure 902. In general, MIKR-GMRES method refers to performing a GMRES operation after augmenting the Krylov subspace of D2 with interpolated Krylov vectors of D1.

As can be seen, the MIKR-GMRES method of the present subject matter is as accurate as the solution set obtained using a conventional GMRES and the solution is reached in substantially lesser number of iterative steps.

Figure 10:
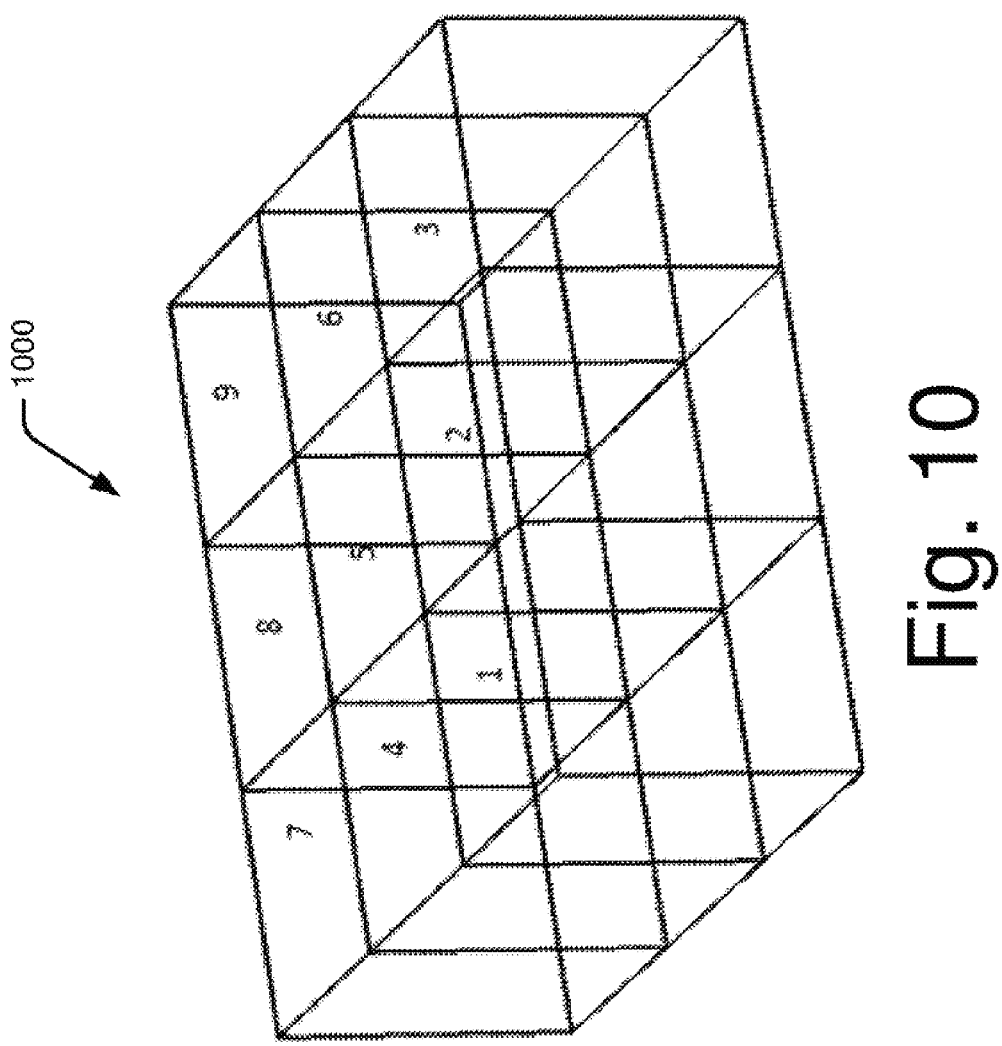
FIG. 10 illustrates a 3×3 dielectric voxel structure for which the simulation is accelerated using the MIKR method and using the Krylov subspace of a primary voxel structure which has been previously simulated, in accordance with an implementation of the present subject matter.

FIG. 10 illustrates a 3×3 dielectric voxel structure 1000 for which the simulation is accelerated using the MIKR method and using the Krylov subspace of a primary voxel structure (one of the nine shown in FIG. 10) whose solution is known, in accordance with an implementation of the present subject matter (Voxel represents a volumetric mesh element that is used to discretize dielectric structures just as triangles are used to discretize the surface of conductor structure). In the base design, each voxel is considered to have the same dielectric constant ($\varepsilon_r$) equal to three. In a design variant, the middle voxel dielectric constant is changed to six keeping the dielectric constant of other voxels fixed at three. A simulation frequency of 4.5 GHz is chosen for the application. The structure is excited from the top with negative z-directed linearly polarized E-field plane wave with 1 V/m strength. The savings in the simulation of the design variant using MIKR methodology as compared to regular GMRES is presented in Table III, where p represents the number of matrix-vector products required for convergence. It can be observed from Table III that MIKR achieves a speed-up of ~5×.

TABLE III

PERFORMANCE OF MIKR COMPARED TO REGULAR GMRES FOR DIELECTRIC VOXEL STRUCTURE DESIGN VARIANT

| Design variant | Structure | Number of SWG faces | Full GMRES | | MIKR | |
|---|---|---|---|---|---|---|
| | | | p | Time (s) | p | Time (s) |
| D1: Base | 3 × 3 voxels with $\varepsilon_r$ = 3 | 5662 | 543 | 35 | — | — |
| D2 | Same as D1 with voxels $\varepsilon_r$ = 6 | 5662 | 542 | 37 | 94 | 7.5 |

Figure 11:
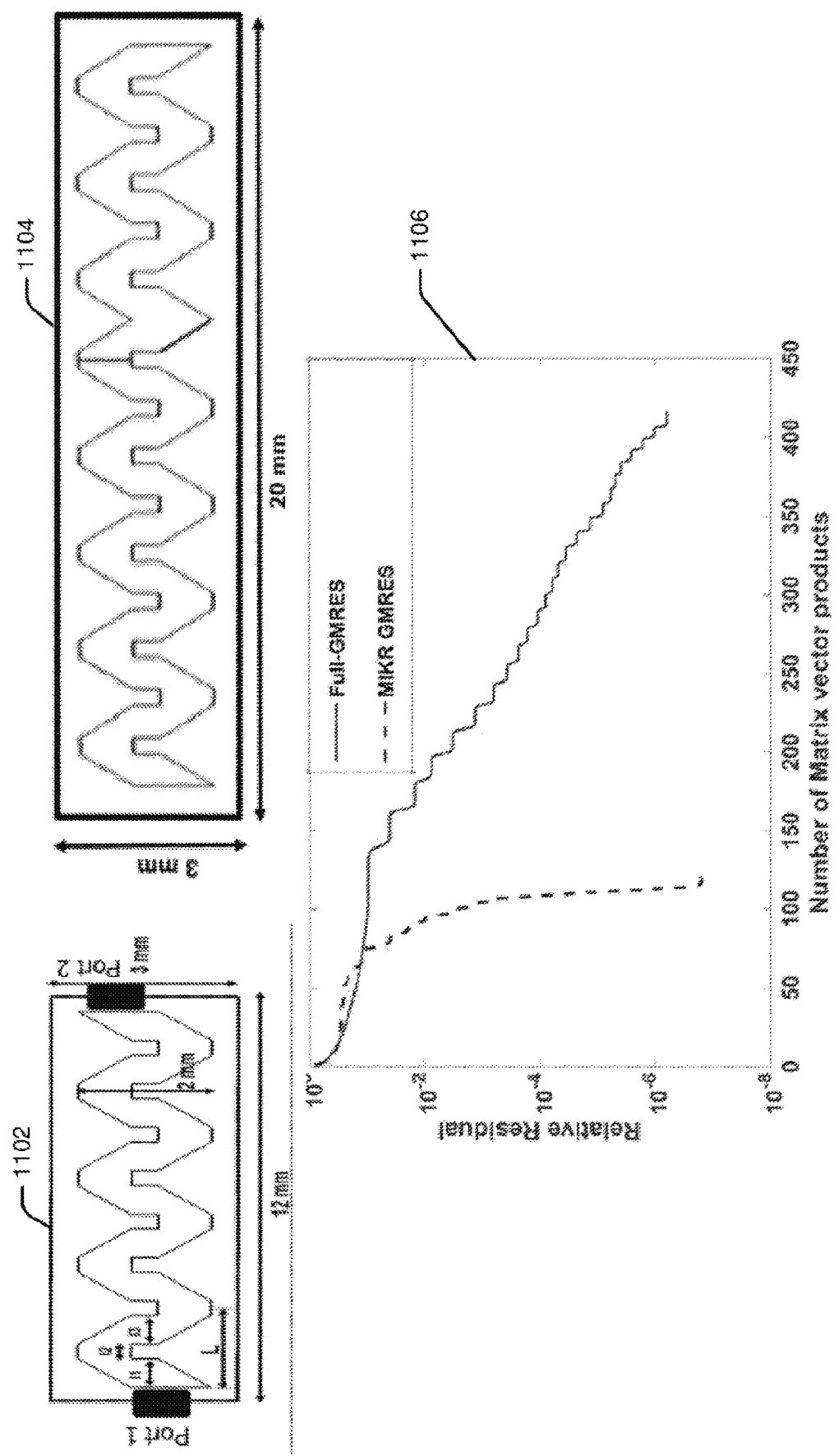
FIG. 11 illustrates another practical application design where a Meander line in a GHz port PCB design is extended and is to be solved as a design variant, in accordance with an implementation of the present subject matter.

FIG. 11 illustrates another practical application design where a Meander line in a GHz port PCB design is extended and is to be solved as a design variant, in accordance with an implementation of the present subject matter. Meander line structures are used in delay line applications as in Double Data Rate 3 (DDR3), DDR4 random access memories (RAMs) designs which require perfect delays to synchronize with a system clock. In accordance with this example, a first meander line 1102 with 4.5 turns over FR4 dielectric on a PCB is considered as the base design. A second meander line 1104 having 8 turns is used as a design variant. Both structures are simulated at 20 GHz with lumped port excitation.

The convergence profile of the GMRES process is illustrated for the design variant in graph 1106 with Full GMRES and MIKR-GMRES. The performance metrics are tabulated in Table IV. As shown in Table IV, a speed-up of around ~3× is achieved using MIKR.

TABLE IV

PERFORMANCE OF MIKR-GMRES COMPARED TO FULL-GMRES FOR MEANDER-LINE STRUCTURE

| Design variant | Change in properties | Number of RWG edges | Full GMRES (p) | MIKR-GMRES (p) |
|---|---|---|---|---|
| D1: Base Design | Meander Line with 4.5 turns | 23821 | 138 | — |
| D2 | Meander Line with 8 turns | 5210 | 437 | 137 |

Figure 12:
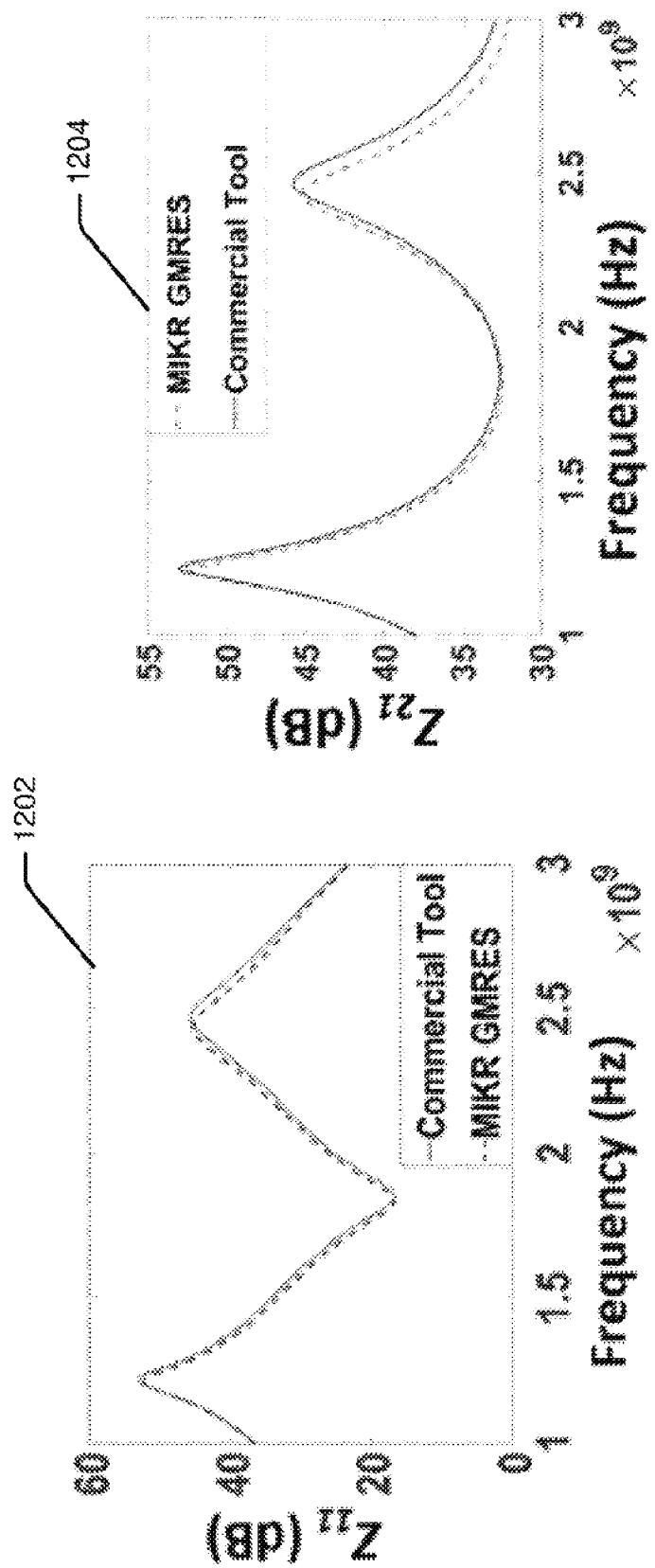
FIG. 12 illustrates preservation of solution accuracy when using the MIKR procedure for the meander line implementation of FIG. 8, in accordance with an implementation of the present subject matter.

FIG. 12 illustrates preservation of solution accuracy when using the MIKR procedure for the meander line implementation of FIG. 11, in accordance with an implementation of the present subject matter. Here, the Z-parameter results for the MIKR procedure are compared to a full GMRES simulation. As can be seen from the graphs 1202 and 1204, the solution accuracy is preserved when the MIKR procedure.

As the extended EM structure resemblance moves further away from that of the base design, the efficacy of the MIKR-GMRES process reduces and errors start to creep in. This is demonstrated for the meander line case as shown in Table V. Simulation is performed for several design variants with every design variant adding up half-a-turn from the preceding design starting from D2. In all the design variant simulations, the Krylov vectors corresponding to the base design D1 has been re-used as in the MIKR procedure.

TABLE V

PERFORMANCE OF MIKR COMPARED TO REGULAR GMRES INTERMS OF SPEED UP WITH INCREASING NUMBER OF TURNS FROM BASE DESIGN (D1) AND RE-USING THE KRYLOV VECTORS OF D1

| Design variant | D2 (8 turns) | D3 (8.5 turns) | D4 (9 turns) | D5 (10 turns) |
|---|---|---|---|---|
| Full GMRES (p) | 437 | 450 | 462 | 490 |
| MIKR-GMRES (p) | 137 | 202 | 224 | 330 |
| Speed up | 3.1× | 2.02× | 2.05× | 1.48× |

MIKR-GMRES method detailed out as in the paragraphs above is for reusing information from the solution of a base design to expedite the convergence of a design variant. The method is independent of the choice of fast-solver scheme and the preconditioning technique. Numerical results demonstrate a speed-up of 2-5× as compared to a regular fast-solver based GMRES procedure.

Until now, techniques for speeding-up EM modelling of EM structures based on Eigen vectors of earlier EM structures alone and Krylov vectors of earlier EM structures alone were discussed. Now, techniques for EM modelling EM structures based on a combination of Eigen vectors and Krylov vectors will be described.

Figure 13A:
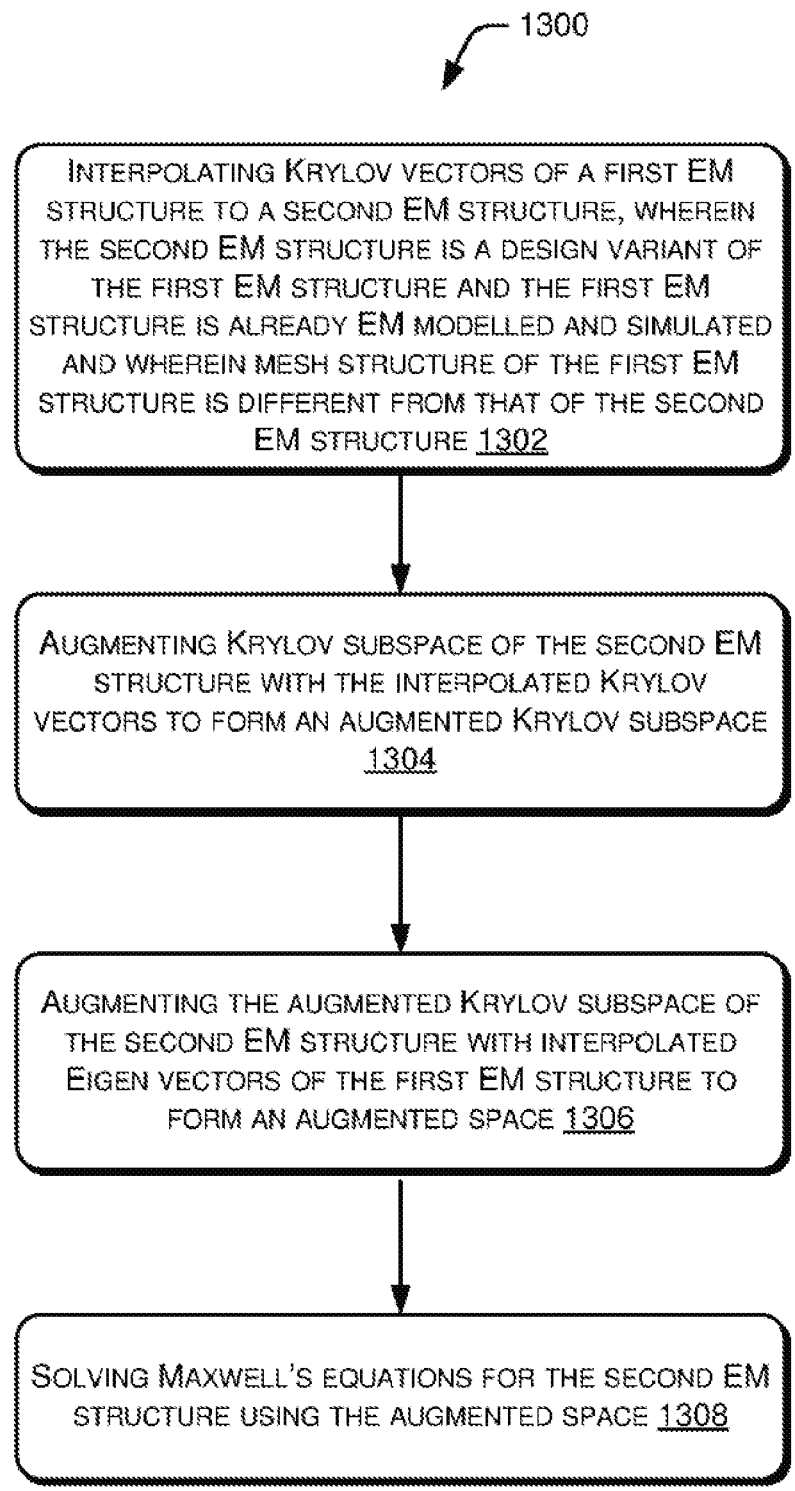
FIG. 13(a) illustrates a method for EM modelling of an EM structure, in accordance with an implementation of the present subject matter.

FIG. 13(a) illustrates a method 1300 for EM modelling of an EM structure using Krylov subspace augmented with Krylov vectors and Eigen vectors, in accordance with an implementation of the present subject matter.

The order in which the method 1300 is described is not intended to be construed as a limitation, and any number of the described method blocks may be combined in any order to implement the method 1300, or an alternative method. Furthermore, the method 1300 may be implemented by processor(s) or computing device(s) through any suitable hardware, non-transitory machine readable instructions, or a combination thereof.

It may be understood that steps of the method 1300 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media.

At block 1302, Krylov vectors of a first EM structure are interpolated to a second EM structure, where the second EM structure is a design variant of the first EM structure, the first EM structure is already EM modelled and simulated, and mesh structure of the first EM structure is different from that of the second EM structure. The first EM structure can be, for example, the first EM structure 102 and the second EM structure can be, for example, the second EM structure 104. The interpolation of the Krylov vectors can be performed using the mesh interpolation technique described with reference to FIGS. 5(a), (b), (c), and (d).

At block 1304, a Krylov subspace of the second EM structure is augmented with the interpolated Krylov vectors to form an augmented Krylov subspace.

At block 1306, the augmented Krylov subspace of the second EM structure is augmented with interpolated Eigen vectors of the first EM structure to form an augmented space.

At block 1308, the Maxwell's equations for the second EM structure are solved using the augmented space.

The various steps of the method 1300 are explained in greater detail with reference to FIG. 13(b).

Figure 13B:
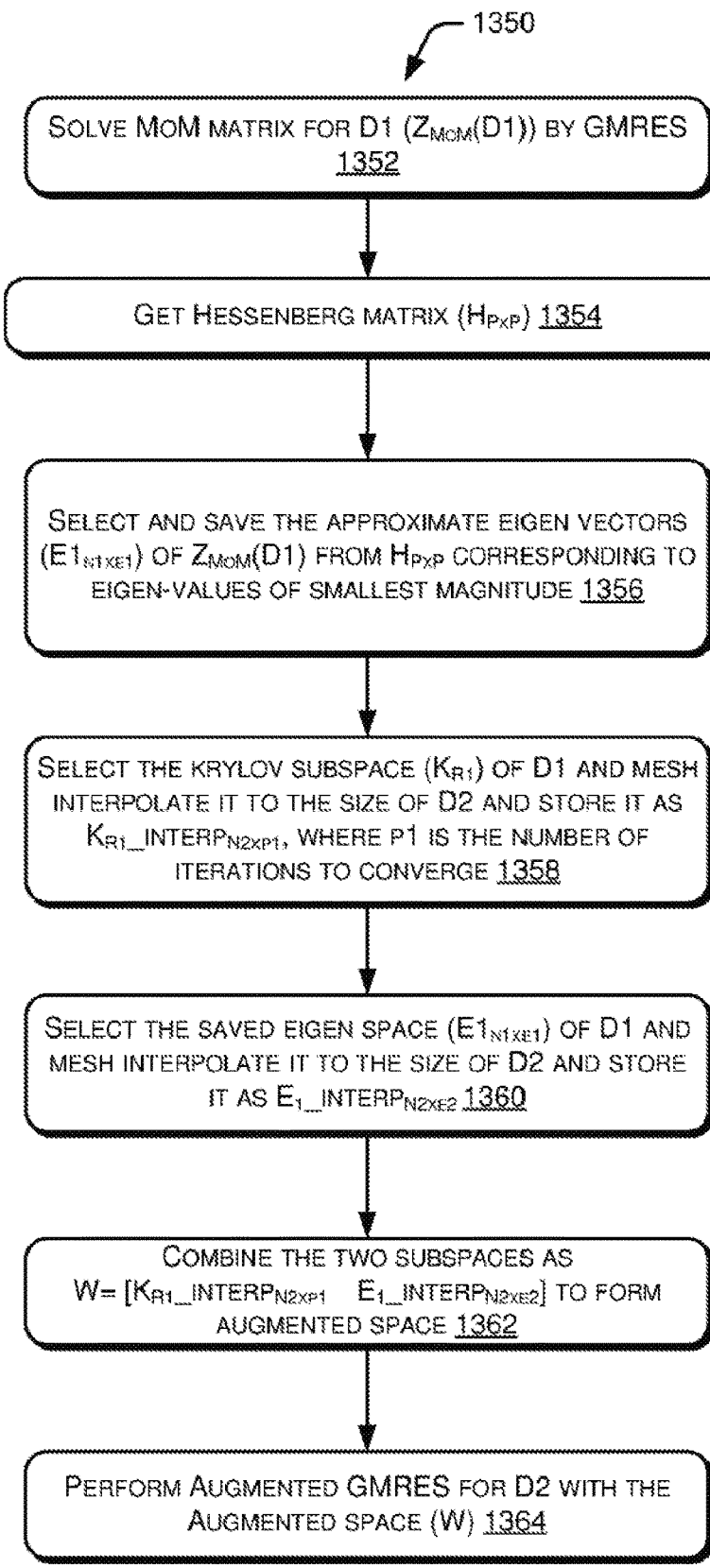
FIG. 13(b) illustrates a Krylov Recycled Eigen Augmented Mesh interpolated (KREAM) method, in accordance with an implementation of the present subject matter.

FIG. 13(b) illustrates the KREAM method 1350, in accordance with an implementation of the present subject matter.

The order in which the method 1350 is described is not intended to be construed as a limitation, and any number of the described method blocks may be combined in any order to implement the method 1350, or an alternative method. Furthermore, the method 1350 may be implemented by processor(s) or computing device(s) through any suitable hardware, non-transitory machine readable instructions, or a combination thereof.

It may be understood that steps of the method 1350 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media.

Here, D1 and D2 are the two near-identical design variants, such as the first EM structure 102 and the second EM structure 104, with arbitrary number of Mesh elements. N1 and N2 are the number of RWG edges for systems D1 and D2 and these are represented by the matrices $Z_{MoM}(D1)$ and $Z_{MoM}(D2)$, respectively.

At block 1352, the matrix for D1, $Z_{MoM}(D1)$ is solved by the GMRES method, as known in the art and briefly explained above.

At block 1354, a Hessenberg matrix ($H_{p \times p}$) is obtained. The Hessenberg matrix may be obtained using modified Arnoldi method of orthogonalization, as known in the art. Here, p is the number of iterations to converge.

At block 1356, the approximate Eigen vectors ($E1_{N1 \times e1}$) of $Z_{MoM}(D1)$ are selected and saved as Eigen space from the Hessenberg matrix corresponding to Eigen values of smallest magnitude and interior Eigen vectors. In other words, Eigen vectors having corresponding small and medium magnitude Eigen values are selected and saved as the Eigen space. Here, e1 refers to the number of eigen vectors saved. The Eigen vectors corresponding to Eigen values of smallest magnitude can be selected using the QZ method. The interior eigen vectors can be selected using the Harmonic Arnoldi method.

At block 1358, the Krylov subspace ($K_{r1}$) of D1 is selected and mesh interpolated to the size of D2. The mesh interpolation can be performed using the procedure explained with reference to FIGS. 5(a), (b), and (c). The mesh interpolated Krylov subspace is stored as $K_{r1\_interp_{N2 \times p1}}$, where p1 is the number of iterations to converge.

At block 1360, the saved eigen space ($E1_{N1 \times e1}$) of D1 selected and mesh interpolated to the size of D2 and stored as $E_{1\_interp_{N2 \times e1}}$. The mesh interpolated Eigen space $E_{1\_interp_{N2 \times e1}}$ can be obtained using the below equation:

$$E_{1\_interp_{N2 \times e1}} = K_{r1\_interp_{N2 \times p1}} \times R_{p1 \times e1} \quad (25)$$

where, $R_{p1 \times e1}$ are the Eigen vectors of the Hessenberg matrix, which are also referred to as Ritz vectors of $Z_{MoM}(D1)$. It can be seen that the interpolated Eigen vectors are generated based on the interpolated Krylov vectors.

The above technique of interpolating Eigen space indirectly, using the interpolated Krylov vectors, is referred to as indirect Eigen interpolation.

At block 1362, the mesh interpolated Krylov subspaces and Eigen spaces from blocks 1358 and 1360 are combined as below to form an augmented space (W):

$$W = [K_{r1\_interp_{N2 \times p1}} \; E_{1\_interp_{N2 \times e1}}] \quad (26)$$

At block 1364, an augmented GMRES is performed for D2 with the augmented space to arrive at the solution for D2, i.e., to solve the Maxwell's equations for D2. The augmented GMRES is explained with reference to FIG. 14.

Figure 14:
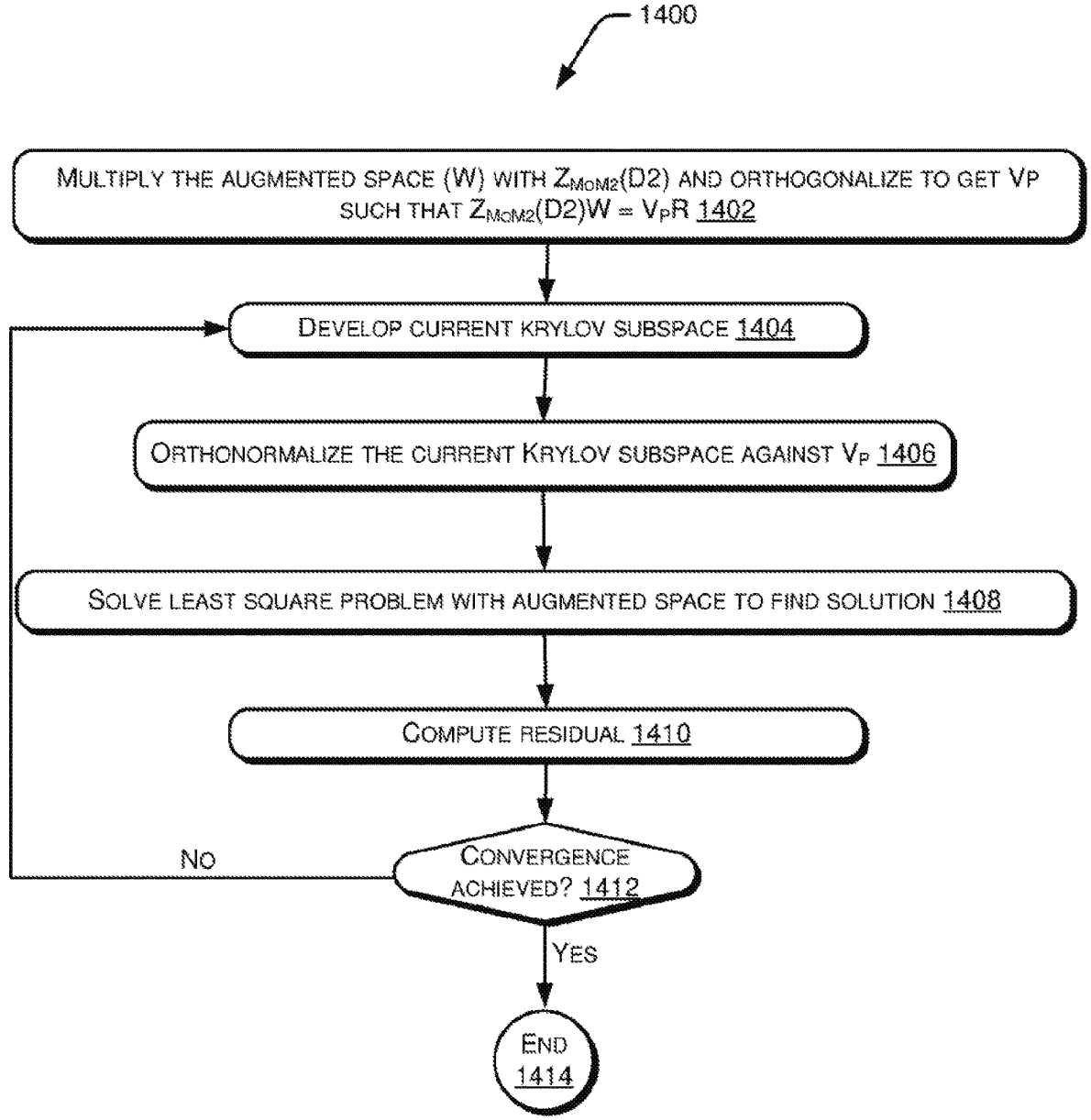
FIG. 14 illustrates an augmented GMRES method, in accordance with an implementation of the present subject matter.

FIG. 14 illustrates the augmented GMRES, in accordance with an implementation of the present subject matter.

The order in which the method 1400 is described is not intended to be construed as a limitation, and any number of the described method blocks may be combined in any order to implement the method 1400, or an alternative method. Furthermore, the method 1400 may be implemented by processor(s) or computing device(s) through any suitable hardware, non-transitory machine readable instructions, or a combination thereof.

It may be understood that steps of the method 1400 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media.

At block 1402, the augmented space (W) is multiplied with $Z_{MoM}(D2)$ and orthogonalized to get $V_P$ such that:

$$Z_{MoM}(D2) * W = V_P * R \quad (27)$$

Here, $V_P \in R^{n \times p}$ has orthonormal columns and $R \in R^{p \times n}$ is upper triangular. $Z_{MoM}(D2) * K_{r1\_interp_{N2 \times p1}}$ and $Z_{MoM}(D2) * E_{1\_interp_{N2 \times e1}}$ come from mesh interpolating $Z_{MoM}(D2) * K_{r1\_interp_{N2 \times p1}}$ and $Z_{MoM}(D2) * E_{1\_interp_{N2 \times e1}}$ to the system size of N2 of D2.

At block 1404, current Krylov subspace is generated, starting at j=1. The current Krylov subspace may be generated by the modified Arnoldi method, as explained earlier.

At block 1406, the current Kyrlov subspace is orthonormalized against $V_P$ as below:

$$Z_{MoM}[W \; V_{p+1:p+j}] = V_{p+j+1} H \quad (28)$$

where, $V_{p+j+1} = [V_p \; V_{p+1:p+j+1}] \in R^{n \times p+j+1}$ has orthonormal columns, and the first column of the trailing n×(j+1) submatrix $V_{p+1:p+j+1}$ of $V_{p+j+1}$ is $(I - V_p V_p^T)b / \|(I - V_p V_p^T)b\|$ for augmented GMRES. The leading principal p×p submatrix of the upper Hessenberg matrix $H \in R^{(p+j+1) \times (p+j)}$ is upper triangular matrix R in QR factorization.

At block 1408, the least square problem with augmented space $_{y \in R^{p+j}}^{min} \|V_{p+j+1}^T b - Hy\|$ is solved to find solution.

$$x_j = [W V_{p+1:p+j}] y_j \quad (29)$$

At block 1410, a residual $r_j$ is computed as per the below equation:

$$r_j = (b_j - Z_{MoM2} x_j) \quad (30)$$

At block 1412, it is checked whether convergence is achieved based on a threshold ε as per the below equation:

$$\frac{\|r_j\|}{\|b\|} \le \varepsilon, \quad (31)$$

If the above equation is true, it is determined that the convergence is achieved, and the process ends at block 1412. If not, the steps through 1404-1412 are repeated after incrementing j by 1.

Figure 15:
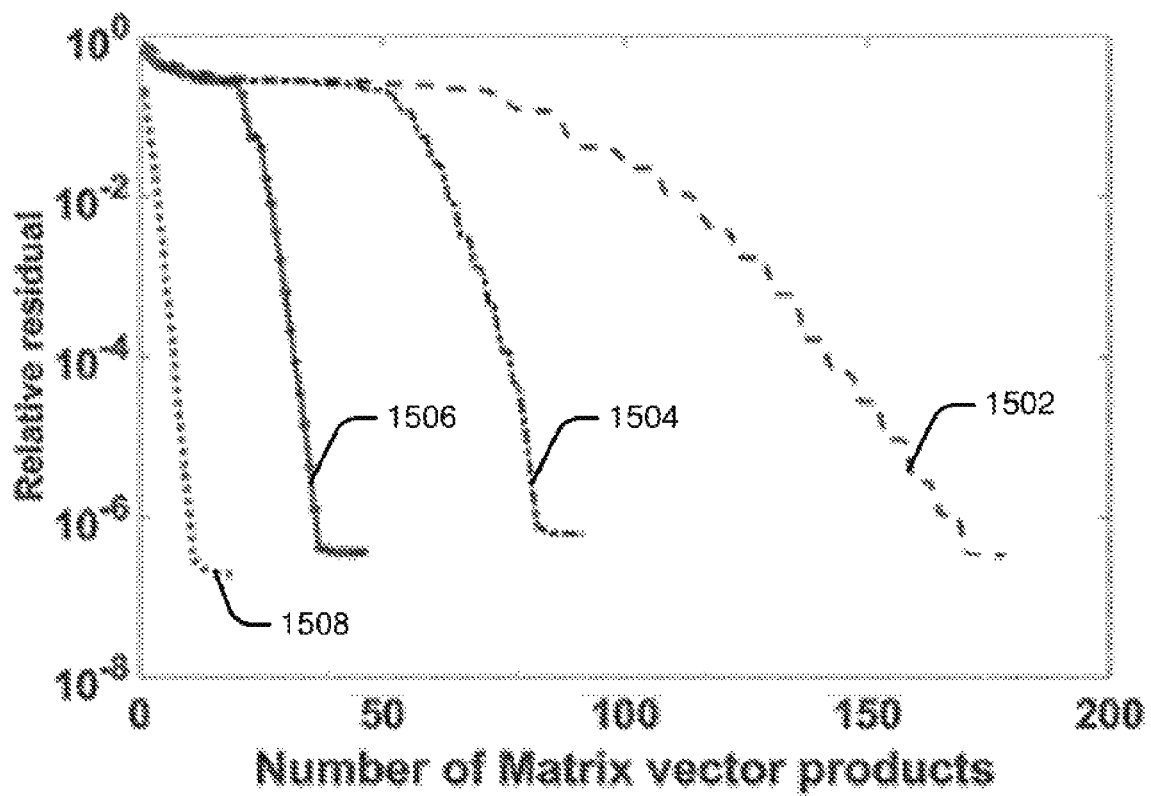
FIG. 15 illustrates the results of application of the KREAM method for an incremental design problem, in accordance with an implementation of the present subject matter.

FIG. 15 illustrates the results of application of the KREAM method for an incremental design problem, in accordance with an implementation of the present subject matter. In this experimentation, Full GMRES is compared with MIKR-GMRES and KREAM. The augmentation of KREAM is developed by restoring interpolated Krylov subspace and adding middle and smallest Eigen vectors to the augmentation space. Here, graph 1502 represents the results from full GMRES, 1504 represents results from MIKR-GMRES, 1506 represents results from adding smallest Eigen vectors to the augmentation space, and 1508 represents results from adding middle Eigen vectors to the augmentation space. It can be seen that the KREAM method provided much faster convergence compares to full GMRES and MIKR-GMRES. It can also be seen that with middle Eigen vectors, simulator speed up between 10× and 20× can be achieved.

Figure 16A:
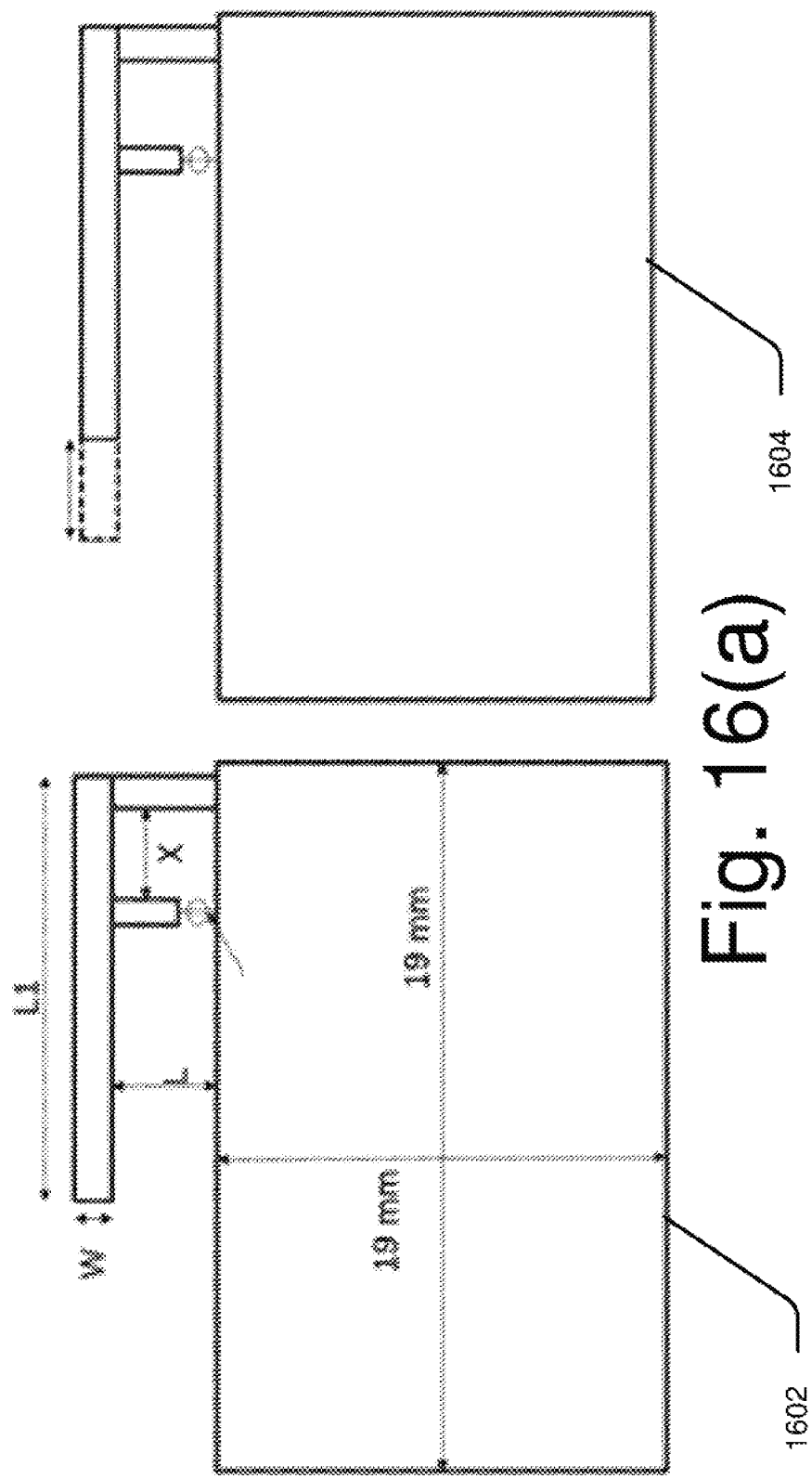
FIGS. 16(a) and 16(b) illustrate the use of a KREAM method based simulator, in accordance with an implementation of the present subject matter.
Figure 16B:
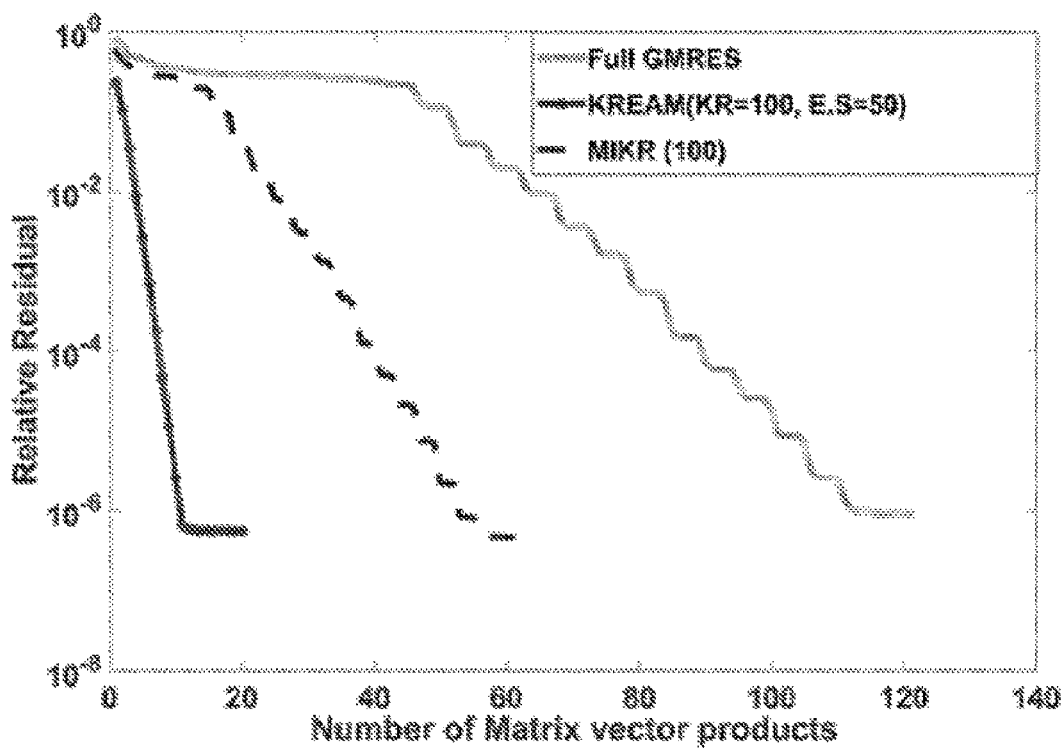

FIGS. 16(*a*) and 16(*b*) illustrate the use of a KREAM method based simulator, in accordance with an implementation of the present subject matter. Here, 1602 represents a basic EM structure that is already solved and 1604 represents an extended EM structure, extended over the basic EM structure 1602. The EM structures 1602 and 1604 relate to an Inverted-F Antenna over air substrate.

The EM structure is simulated from 10 GHz to 13 GHz with increment of 500 MHz. The incremental problem is created at 12 GHz with second design variant as elongated length of antenna arm as in 1604 in FIG. 16(*a*) and with higher mesh density. In a practical scenario, antenna is tuned by setting the arm length as parameter in order to match the feed impedance for better standing wave ratio. Table VI below exemplifies the physical dimensions of the layout.

TABLE VI

Physical dimensions of layout for FIG. 14

| Physical Parameter | Description | value |
|---|---|---|
| L1 | Initial trace length | 1 mm |
| L | Pad diameter | 2 mm |
| X | Post pad trace length | 1 mm |
| ΔL | Via diameter | 1 mm |

From FIG. 16(*b*), it can be seen that the KREAM method with 100 Krylov vectors and 50 small Eigen vectors combined together as information subspace can almost triple speedup compared to MIKR. The total speed up obtained is around 10× the speedup achieved with the KREAM simulator.

Figure 17:
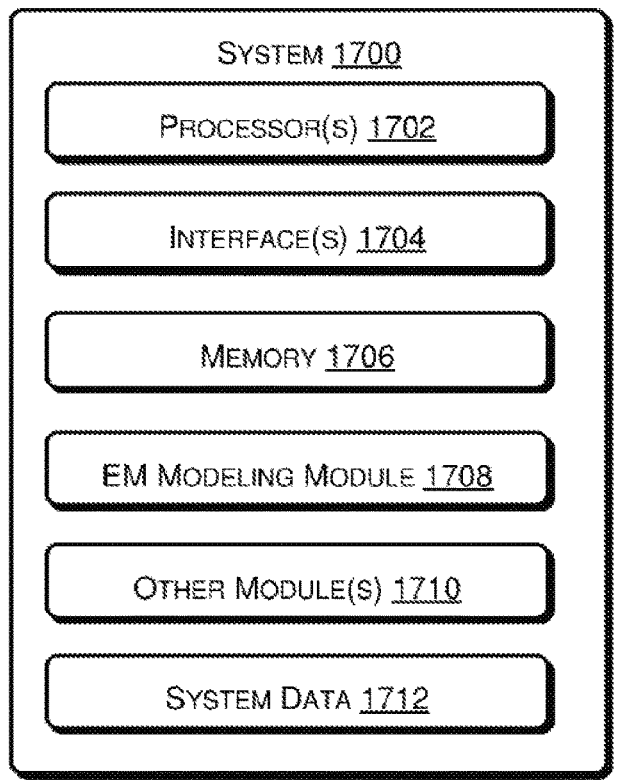
FIG. 17 illustrates a computational system for EM modelling of an EM structure, in accordance with an implementation of the present subject matter.

FIG. 17 illustrates a computational system 1700 for EM modelling of an EM structure, in accordance with an implementation of the present subject matter. The computational system 1700 can be used to perform any of the above described methods for speeding-up solving of EM structures.

The computational system 1700 includes a processor(s) 1702, interface(s) 1704, memory 1706, electromagnetic (EM) modelling module 1708, other module(s) 1710, and system data 1712. The computational system 1700 may be implemented as any computing system which may be, but is not restricted to, a server, a workstation, a desktop computer, a laptop, a smartphone, a personal digital assistant (PDA), a tablet, a virtual host, and an application.

The computational system 1700 may also be machine-readable instructions based implementation or a hardware-based implementation, or a combination thereof. The processor(s) 1702 may be implemented as microprocessors, microcomputers, microcontrollers, digital signal processors, central processing units, state machines, logic circuitries, and/or any devices that manipulate signals based on operational instructions. Among other capabilities, the processor(s) 1702 may fetch and execute computer-readable instructions stored in a memory. The functions of the processor(s) 1702 may be provided through the use of dedicated hardware as well as hardware capable of executing machine readable instructions. In one of the implementations the processor(s) system 1702 and the memory may be integrated into one processor chip with multiple cores and the on chip memory directly divided and bus connectable to multiple clusters of the processor(s) cores to aid rapid parallelization of the iterative procedures involved in the matrix solution with the Augmented Krylov space method with mesh interpolation.

The interface(s) 1704 may include a variety of machine readable instructions-based interfaces and hardware interfaces that allow interaction with a user and with other communication and computing devices, such as network entities, web servers, and external repositories, and peripheral devices.

The memory 1706 may be coupled to the processor(s) 1702 and may, among other capabilities, provide data and instructions for generating different requests. The memory 1706 can include any computer readable medium known in the art including, for example, volatile memory, such as static random access memory (SRAM) and dynamic random access memory (DRAM), Multi-channel DRAM (MCDRAM) and/or non-volatile memory, such as read only memory (ROM), erasable programmable ROM, flash memories, hard disks, optical disks, and magnetic tapes.

The EM modelling module 1708, and the other modules 1710 may be coupled to and/or be executable by processor(s), and may include, amongst other things, routines, programs, objects, components, data structures, and the like, which perform particular tasks or implement particular abstract data types. The other modules 1710 may include programs or coded instructions that supplement applications and functions, for example, programs in the operating system, of the computational system 1700.

Though shown as separate modules, it will be understood that in other implementations, some or all of the EM modelling module 1708 and the other modules 1710 may be implemented as a part of the same module. Further, the EM modelling module 1708 and the other modules 1710 may be implemented in hardware, instructions executed by a processing unit, or by a combination thereof.

The system data 1712 may serve as a repository for storing data that may be fetched, processed, received, or created by the EM modelling module 1708 during the iterative simulation procedure and the other modules 1710 or received from connected computing systems and storage devices.

In an implementation, the EM modelling module 1708 can augment Krylov subspace of a second EM structure with Eigen vectors of a first EM structure to form an augmented space, where the second EM structure is a design variant of the first EM structure and the first EM structure is already EM modelled and simulated. Further, the EM modelling module 1708 can then solve Maxwell's equations for the second EM structure using the augmented space.

In another implementation, the EM modelling module 1708 can interpolate Krylov vectors of a first EM structure, augment Krylov subspace of the second EM structure with the interpolated Krylov vectors to form an augmented Krylov subspace, augment the augmented Krylov subspace of the second EM structure with interpolated Eigen vectors of the first EM structure to form an augmented space, and solve Maxwell's equations for the second EM structure using the augmented Krylov subspace.

Although the present subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter.

We claim:

1. A method for electromagnetic (EM) modelling and simulation of an EM structure, the EM structure being an electronic equipment that is to emit EM radiation, to ensure electromagnetic compatibility and to reduce electromagnetic interference of the EM structure, the method comprising:
- obtaining Eigen vectors of a first EM structure from solution of Maxwell's equations for the first EM structure, wherein Maxwell's equations for the first EM structure are solved during EM modelling and simulation of the first EM structure;
- when a mesh structure of the first EM structure is different from that of a second EM structure, interpolating the Eigen vectors of the first EM structure to a second EM structure, wherein the second EM structure is a design variant of the first EM structure;
- augmenting Krylov subspace of a second EM structure with Eigen vectors of the first EM structure to form an augmented space;
- performing EM modelling and simulation of the second EM structure;
- solving Maxwell's equations for the second EM structure using the augmented space to perform the EM modelling and simulation of the second EM structure; and
- determining, based on the solving, whether the EM radiation of the second EM structure is within a threshold EM radiation limit to ascertain electromagnetic compatibility of the second EM structure.

2. The method as claimed in claim 1, wherein interpolating the Eigen vectors of the first EM structure to the second EM structure comprises:
- interpolating Krylov vectors of the first EM structure to the second EM structure; and
- generating interpolated Eigen vectors based on interpolated Krylov vectors.

3. The method as claimed in claim 2, wherein interpolating the Krylov vectors comprises:
- mapping each edge centre in the mesh structure of the second EM structure to a corresponding mesh component in the mesh structure of the first EM structure; and
- applying a set of linear transformations to generate the interpolated Krylov vectors.

4. The method as claimed in claim 1, wherein the second EM structure has a larger or smaller dimension than the first EM structure.

5. The method as claimed in claim 1, wherein the Maxwell's equations for the second EM structure are solved using a Generalized Minimal Residual (GMRES) process in the augmented space.

6. The method as claimed in claim 1, comprising selecting Eigen vectors that are to be augmented in the Krylov subspace based on Eigen values corresponding to the Eigen vectors.

7. The method as claimed in claim 6, wherein each of the Eigen values has one of a small, medium, and large magnitude, and wherein selecting the Eigen vectors comprises selecting Eigen vectors whose corresponding Eigen values have one of small and medium magnitudes.

8. A method for electromagnetic (EM) modelling and simulation of an EM structure, the EM structure being an electronic equipment that is to emit EM radiation, to ensure electromagnetic compatibility and to reduce electromagnetic interference, the method comprising:
- obtaining Eigen vectors of a first EM structure from solution of Maxwell's equations for the first EM structure, wherein Maxwell's equations for the first EM structure are solved during EM modelling and simulation of the first EM structure;
- interpolating Krylov vectors of the first EM structure to a second EM structure, wherein the second EM structure is a design variant of the first EM structure and the first EM structure is already EM modelled and simulated and wherein mesh structure of the first EM structure is different from that of the second EM structure;
- augmenting Krylov subspace of the second EM structure with the interpolated Krylov vectors to form an augmented Krylov subspace;
- interpolating Eigen vectors of the first EM structure to the second EM structure;
- augmenting the augmented Krylov subspace of the second EM structure with interpolated Eigen vectors of the first EM structure to form an augmented space;
- performing EM modelling and simulation of the second EM structure;
- solving Maxwell's equations for the second EM structure using the augmented space to perform the EM modelling and simulation of the second EM structure; and
- determining, based on the solving, whether the EM radiation of the second EM structure is within a threshold EM radiation limit to ascertain electromagnetic compatibility of the second EM structure.

9. The method as claimed in claim 8, comprising generating the interpolated Eigen vectors based on the interpolated Krylov vectors.

10. A system for performing electromagnetic (EM) modelling and simulation of an EM structure, the EM structure being an electronic equipment that is to emit electromagnetic radiation, to ensure electromagnetic compatibility and to reduce electromagnetic interference, the system comprising:
- a processor;
- an EM modelling module coupled to the processor to:
  - obtain Eigen vectors of a first EM structure from solution of Maxwell's equations for the first EM structure, wherein Maxwell's equations for the first EM structure are solved during EM modelling and simulation of the first EM structure;
  - when a mesh structure of the first EM structure is different from that of the second EM structure, interpolate Eigen vectors of the first EM structure to a second EM structure, wherein the second EM structure is a design variant of the first EM structure;
  - augment Krylov subspace of the second EM structure with the Eigen vectors of the first EM structure to form an augmented subspace;
  - augment the augmented Krylov subspace of the second EM structure with interpolated Eigen vectors of the first EM structure to form an augmented space;
  - performing EM modelling and simulation of the second EM structure;
  - solve Maxwell's equations for the second EM structure using the augmented space to perform the EM modelling and simulation of the second EM structure; and
  - determine, based on the solving, whether the EM radiation of the second EM structure is within a threshold EM radiation limit to ascertain electromagnetic compatibility of the second EM structure.

11. The system as claimed in claim 10, wherein to interpolate the Krylov vectors, the EM modelling module is to:
  map each edge centre in the mesh structure of the second EM structure to a corresponding mesh component in the mesh structure of the first EM structure; and
  apply a set of linear transformations to generate the interpolated Krylov vectors.

12. The system as claimed in claim 10, wherein the EM modelling module is to generate the interpolated Eigen vectors based on the interpolated Krylov vectors.

13. The system as claimed in claim 10, wherein the EM modelling module is to select Eigen vectors that are to be interpolated based on Eigen values corresponding to the Eigen vectors.

14. The system as claimed in claim 10, wherein, to interpolate the Eigen vectors of the first EM structure to the second EM structure, the EM modelling module is to:
  interpolate Krylov vectors of the first EM structure to the second EM structure; and
  generate interpolated Eigen vectors based on the interpolated Krylov vectors.

\* \* \* \* \*